US008839439B2

(12) United States Patent
Zhou et al.

(10) Patent No.: US 8,839,439 B2
(45) Date of Patent: *Sep. 16, 2014

(54) OPERATION OF A DUAL INSTRUCTION PIPE VIRUS CO-PROCESSOR

(71) Applicant: Fortinet, Inc., Sunnyvale, CA (US)

(72) Inventors: Xu Zhou, Milpitas, CA (US); Lin Huang, Fremont, CA (US); Michael Xie, Palo Alto, CA (US)

(73) Assignee: Fortinet, Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/761,723

(22) Filed: Feb. 7, 2013

(65) Prior Publication Data

US 2013/0152203 A1   Jun. 13, 2013

Related U.S. Application Data

(63) Continuation of application No. 11/836,779, filed on Aug. 10, 2007, now Pat. No. 8,375,449.

(51) Int. Cl.
*G06F 11/30* (2006.01)
*G06F 12/14* (2006.01)
*G06F 21/56* (2013.01)
*G06F 21/55* (2013.01)
*H04L 29/06* (2006.01)

(52) U.S. Cl.
CPC ............. *G06F 21/56* (2013.01); *G06F 21/561* (2013.01); *G06F 21/558* (2013.01); *H04L 63/1416* (2013.01); *H04L 63/1433* (2013.01)
USPC ................ 726/24; 713/188; 713/193; 726/25

(58) Field of Classification Search
None
See application file for complete search history.

(56) References Cited

U.S. PATENT DOCUMENTS

| 4,845,715 A | 7/1989 | Francisco |
| 5,050,213 A | 9/1991 | Shear |
| 5,103,476 A | 4/1992 | Waite et al. |
| 5,121,345 A | 6/1992 | Lentz |
| 5,347,578 A | 9/1994 | Duxbury |
| 5,359,659 A | 10/1994 | Rosenthal |

(Continued)

OTHER PUBLICATIONS

Final Rejection for U.S. Appl. No. 11/837,053, mailed Feb. 17, 2011.

(Continued)

*Primary Examiner* — Fatoumata Traore
(74) *Attorney, Agent, or Firm* — Hamilton, DeSanctis & Cha LLP

(57) ABSTRACT

Circuits and methods are provided for detecting, identifying and/or removing undesired content. According to one embodiment, a method for virus processing content objects is provided. A content object is stored within a system memory by a general purpose processor using a virtual address. Most recently used entries of a page directory and a page table of the system memory are cached within a translation lookaside buffer (TLB) of a virus co-processor. Instructions are read from a virus signature memory of the co-processor. Those of a first type are assigned to a first of multiple instruction pipes of the co-processor. The first instruction pipe executes an instruction including accessing a portion of the content object by performing direct virtual memory addressing of the system memory using a physical address derived based on the virtual address and the TLB and comparing it to a string associated with the instruction.

20 Claims, 13 Drawing Sheets

(56) References Cited

U.S. PATENT DOCUMENTS

| | | | |
|---|---|---|---|
| 5,481,693 | A | 1/1996 | Blomgren et al. |
| 5,598,546 | A | 1/1997 | Blomgren |
| 5,623,600 | A | 4/1997 | Ji et al. |
| 5,696,822 | A | 12/1997 | Nachenberg |
| 5,799,163 | A | 8/1998 | Park et al. |
| 5,951,698 | A | 9/1999 | Chen et al. |
| 6,016,546 | A | 1/2000 | Kephart et al. |
| 6,079,011 | A | 6/2000 | Song |
| 6,195,587 | B1 | 2/2001 | Hruska et al. |
| 6,272,616 | B1 | 8/2001 | Fernando et al. |
| 6,357,008 | B1 | 3/2002 | Nachenberg |
| 6,449,658 | B1 | 9/2002 | Lafe et al. |
| 6,578,140 | B1 | 6/2003 | Policard |
| 6,609,205 | B1 | 8/2003 | Bernhard et al. |
| 6,615,166 | B1 | 9/2003 | Guheen et al. |
| 6,622,150 | B1 | 9/2003 | Kouznetsov et al. |
| 6,718,469 | B2 | 4/2004 | Pak et al. |
| 6,748,534 | B1 | 6/2004 | Gryaznov et al. |
| 6,772,345 | B1 | 8/2004 | Shetty |
| 6,785,821 | B1 | 8/2004 | Teal |
| 6,792,543 | B2 | 9/2004 | Pak et al. |
| 6,792,546 | B1 | 9/2004 | Shanklin et al. |
| 6,886,099 | B1 | 4/2005 | Smithson et al. |
| 6,892,303 | B2 | 5/2005 | Le Pennec et al. |
| 6,971,019 | B1 | 11/2005 | Nachenberg |
| 6,986,052 | B1 | 1/2006 | Mittal |
| 7,124,282 | B2 | 10/2006 | Zandveld et al. |
| 7,228,432 | B2 | 6/2007 | Angelo et al. |
| 7,363,655 | B2 | 4/2008 | Franczek et al. |
| 7,367,057 | B2 | 4/2008 | Das et al. |
| 7,430,652 | B2 | 9/2008 | Hundley |
| 7,454,418 | B1 | 11/2008 | Wang |
| 7,467,285 | B2 | 12/2008 | Khosravi et al. |
| 7,636,858 | B2 | 12/2009 | Khan et al. |
| 7,673,343 | B1 * | 3/2010 | Barton et al. .................. 726/24 |
| 7,694,150 | B1 | 4/2010 | Kirby |
| 7,761,605 | B1 | 7/2010 | Rothwell et al. |
| 7,797,747 | B1 | 9/2010 | Ferrie |
| 7,802,303 | B1 | 9/2010 | Zhao et al. |
| 7,823,205 | B1 | 10/2010 | Isenberg et al. |
| 7,854,008 | B1 | 12/2010 | Huang et al. |
| 8,079,084 | B1 | 12/2011 | Huang et al. |
| 8,239,950 | B1 | 8/2012 | Huang et al. |
| 8,375,449 | B1 | 2/2013 | Zhou |
| 8,443,450 | B1 | 5/2013 | Zhou et al. |
| 2004/0250045 | A1 | 12/2004 | Dowling |
| 2004/0255124 | A1 * | 12/2004 | Courcambeck et al. ...... 713/176 |
| 2005/0102601 | A1 | 5/2005 | Wells |
| 2005/0216759 | A1 | 9/2005 | Rothman et al. |
| 2006/0064755 | A1 | 3/2006 | Azadet et al. |
| 2006/0107055 | A1 | 5/2006 | Panwar et al. |
| 2006/0200863 | A1 | 9/2006 | Ray et al. |
| 2007/0198879 | A1 | 8/2007 | Yim et al. |
| 2008/0155275 | A1 | 6/2008 | Natarajan et al. |
| 2008/0301670 | A1 | 12/2008 | Gouge et al. |
| 2012/0317646 | A1 | 12/2012 | Huang et al. |

OTHER PUBLICATIONS

Non-Final Rejection for U.S. Appl. No. 11/837,058, mailed Jun. 24, 2010.
Non-Final Rejection for U.S. Appl. No. 11/837,064, mailed Jul. 9, 2010.
Final Office Action for U.S. Appl. No. 11/837,064 mailed Dec. 27, 2010.
Non-Final Rejection for U.S. Appl. No. 11/836,779 mailed Oct. 18, 2011.
Final Rejection for U.S. Appl. No. 12/644,794, mailed Apr. 20, 2012.
Notice of Allowance for U.S. Appl. No. 11/837,058 mailed Nov. 8, 2010.
Notice of Allowance for U.S. Appl. No. 11/837,064 mailed Nov. 8, 2011.
Non-Final Rejection for U.S. Appl. No. 12/641,311, mailed Feb. 2, 2012.
Non-Final Rejection for U.S. Appl. No. 12/644,794 mailed Nov. 8, 2011.
Final Rejection for U.S. Appl. No. 11/837,058 mailed Oct. 18, 2010.
Notice of Allowance for U.S. Appl. No. 12/641,311 mailed Sep. 4, 2013.
Non-Final Rejection for U.S. Appl. No. 13/567,183 mailed May 9, 2013.
Notice of Allowance for U.S. Appl. No. 13/567,183 mailed Oct. 28, 2013.
Final Rejection for U.S. Appl. No. 12/641,309 mailed Jun. 20, 2012.
Non-Final Rejection for U.S. Appl. No. 12/641,309 mailed Jan. 12, 2012.
Notice of Allowance for U.S. Appl. No. 11/836,779 mailed Jan. 9, 2013.
Final Rejection for for U.S. Appl. No. 11/836,779 mailed Jun. 28, 2012.
Non-Final Rejection for for U.S. Appl. No. 11/836,779 mailed Feb. 10, 2011.
Notice of Allowance for or U.S. Appl. No. 12/641,309 mailed Apr. 2, 2013.

* cited by examiner

OPERATION OF A DUAL INSTRUCTION PIPE VIRUS CO-PROCESSOR

CROSS REFERENCE TO RELATED APPLICATIONS

The present application is a continuation of U.S. patent application Ser. No. 11/836,779, filed Aug. 10, 2007, now U.S. Pat. No. 8,375,449, which is hereby incorporated by reference in its entirety for all purposes.

The present application may relate to subject matter in one or more of U.S. patent application Ser. No. 10/624,948; U.S. patent application Ser. No. 10/624,941; U.S. patent application Ser. No. 10/624,452; and U.S. patent application Ser. No. 10/624,914 each of which are hereby incorporated by reference in their entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2007-2013, Fortinet, Inc.

BACKGROUND

1. Field

Embodiments of the present invention generally relate to circuits and methods used for processing information, and more particularly to circuits and methods for detecting, identifying and/or removing undesired content.

2. Description of the Related Art

The generation and spreading of computer viruses are major problems in computer systems and computer networks. A computer virus is a program that is capable of attaching to other programs or sets of computer instructions, replicating itself, and performing unsolicited actions. Viruses may be embedded, for example, in email attachments, files downloaded from the Internet, and various application files. In some cases, such computer viruses may result in mild interference with system performance up to destruction of data and/or undermining of system integrity.

Various software products have been developed to detect and in some cases eliminate computer viruses from a system. Such software products are installed by organizations on either individual computers or in relation to computer networks. However, with the multitude of known viruses and the almost weekly proliferation of new viruses, execution of software to check for viruses often has a noticeable negative impact on the operation of the computers and computer systems that it is designed to protect. This negative impact may often become substantial, and in some cases more substantial than the impact posed by many potential viruses.

SUMMARY

Circuits and methods for detecting, identifying and/or removing undesired content are described. According to one embodiment, a method for virus processing content objects is provided. A content object that is to be virus processed is stored by a general purpose processor to a system memory of the general purpose processor using a virtual address. The system memory has stored therein a page directory and a page table containing information for translating virtual addresses to physical addresses within a physical address space of the system memory. Multiple most recently used entries of the page directory and the page table are cached by a virus co-processor, coupled to the general purpose processor via an interconnect bus, within one or more translation lookaside buffers implemented within an on-chip cache of the virus co-processor. A subset of instructions are read by the virus co-processor, from a virus signature memory of the virus co-processor. The subset of instructions contains op-codes of a first instruction type and op-codes of a second instruction type. Instructions of the subset of instructions of the first instruction type are assigned for execution by the virus co-processor to a first instruction pipe of multiple instruction pipes of the virus co-processor. An instruction of the instructions assigned to the first instruction pipe is executed by the first instruction pipe including accessing a portion of the content object from the system memory by performing direct virtual memory addressing of the system memory using a physical address derived based on the virtual address and the one or more translation lookaside buffers and comparing the portion of the content object against a string associated with the instruction.

This summary provides only a general outline of an embodiment of the present invention. Other features of embodiments of the present invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several drawings to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION

Circuits and methods used for detecting, identifying and/or removing undesired content are described.

Figure 1:
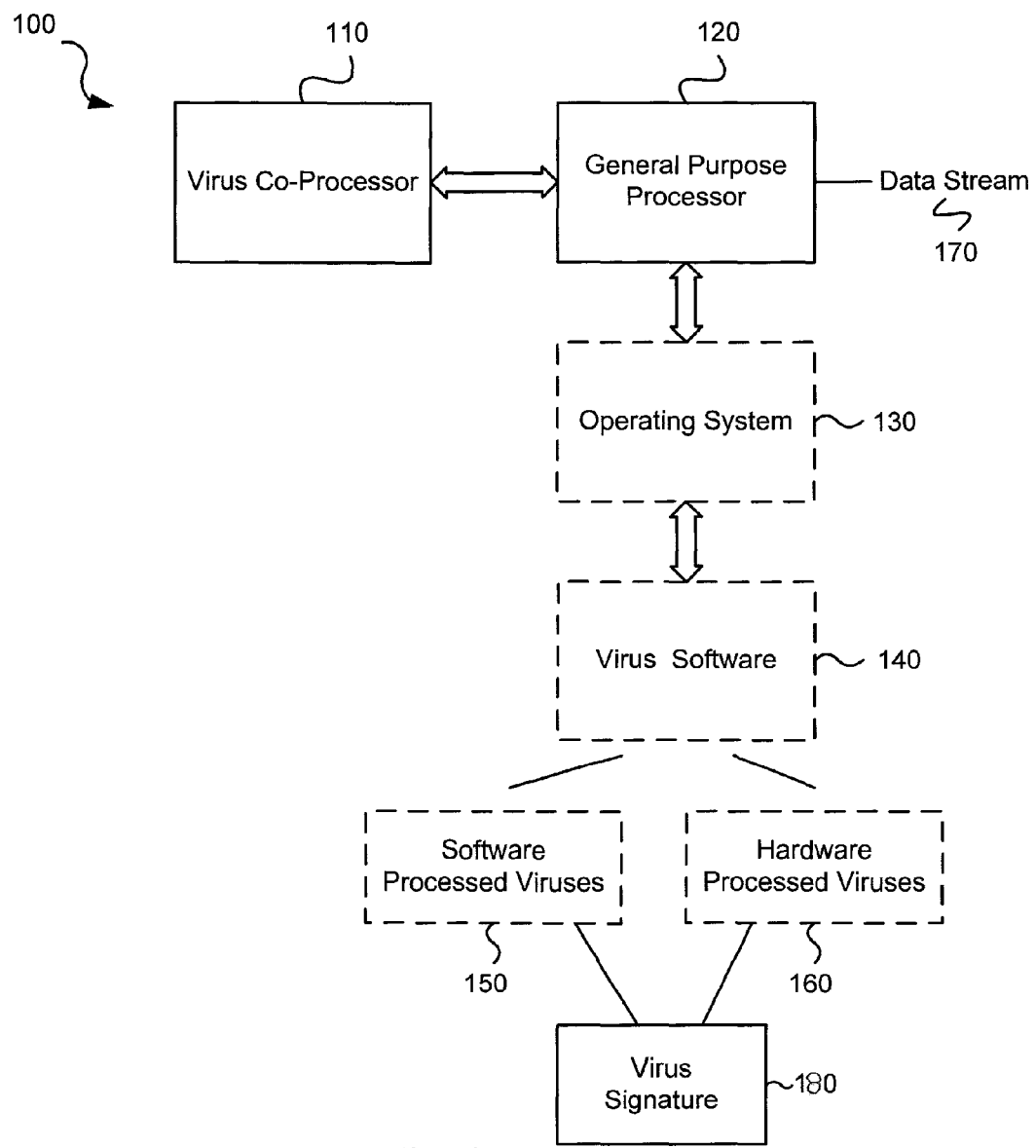
FIG. 1 depicts a combined hardware and software virus processing system in accordance with one or more embodiments of the present invention.

Turning to FIG. 1, a combined hardware and software virus processing system 100 is shown in accordance with one or more embodiments of the present invention. System 100 includes a general purpose processor 120 and a virus co-processor 110. General purpose processor 120 executes virus software 140 that is operating on a platform of an operating system 130. Virus software 140 is capable of detecting, identifying and/or cleaning or quarantining a number of different viruses. Virus software 140 may be written in any software language known in the art, and compiled using a compiler tailored for the particular software language and target platform. Based on the disclosure provided herein, one of ordinary skill in the art will recognize a variety of software languages, compilers and/or operating systems that may be employed in relation to different embodiments of the present invention.

Processing for some of the viruses is done purely in software. Such software processing involves general purpose processor 120 executing software instructions tailored for virus processing and is identified as software processed viruses 150. Software processed viruses may include one or more of a general set of virus signatures 180 that are compiled for execution on general purpose processor 120. Processing for others of the viruses may be done using a combination of software processing and hardware processing. Such combination software and hardware processing includes performing one or more virus processing functions on virus co-processor 110 and executing one or more instructions on general purpose processor 120. These viruses are identified as hardware processed viruses 160. Such hardware processed viruses may include one or more of the general set of virus signatures 180 that are compiled for execution on virus co-processor 110. Thus, in some cases, virus software 140 includes a compiled set of virus signatures that may be executed by virus co-processor 110. This compiled set of virus signature may be written to a memory associated with virus co-processor 110 through execution by general purpose processor 120 of one or more instructions included in virus software 140. It should be noted that the terms software and hardware are used somewhat loosely as virus co-processor may execute one or more local instructions, and general purpose processor is itself a hardware device. However, these words are used herein to refer to processes performed by the general purpose processor 120 at the direction of virus software 140 (i.e., software processing) and processes performed by virus co-processor 110 either purely in hardware or under the direction of software instructions (i.e., hardware processing). Virus co-processor 110 may be implemented as a semiconductor device such as, for example, a programmable gate array or an application specific integrated circuit. Based on the disclosure provided herein, one of ordinary skill in the art will recognize a variety of technologies that may be used to implement virus co-processor 110.

In some embodiments of the present invention, two compilers are utilized. The first compiler is designed to compile virus signatures for execution in software, and the second compiler is designed to compile virus signatures for execution in hardware. In some cases, the same virus signatures are compiled for both hardware and software execution.

General purpose processor 120 may be any processor that is tailored for executing software commands indicated by an operating system. Thus, for example, general purpose processor may be, but is not limited to the various processors currently found in personal computers such as those offered by Intel and AMD. In contrast, virus co-processor 110 is tailored for performing one or more functions under the control of or at the request of general purpose processor 120. Such functions include, but are not limited to, virus detection and/or virus identification of a particular subset of viruses that may be processed by virus co-processor 110. Other viruses that are not supported by virus co-processor 110 may be processed by general purpose processor 120. In one particular embodiment of the present invention, general purpose processor 120 is a generally available Intel processor and operating system 130 is one of the currently available Microsoft Windows operating systems. Based on the disclosure provided herein, one of ordinary skill in the art will recognize a variety of general purpose processors and/or operating systems that may be used in relation to different embodiments of the present invention.

In operation, virus co-processor 110 is programmed or otherwise enabled to detect and/or identify viruses included in hardware processed viruses 160. This may be accomplished through execution of one or more setup instructions included in virus software 140. The setup instructions may be executed by general purpose processor 120 to cause the aforementioned compiled set of virus signatures to be written to a memory accessible to virus co-processor 110. This compiled set of virus signatures may then be executed locally by virus co-processor 110. Based on the disclosure provided herein, one of ordinary skill in the art will recognize a variety of setup processes that may be performed in relation to one or more embodiments of the present invention.

A data stream 170 is received by general purpose processor 120, and is reviewed to determine whether it has been infected by one or more viruses. General purpose processor 170 makes the data in data stream 170 available to virus co-processor 110. General purpose processor 120 may then perform one or more virus scans by executing instructions in relation to the data in data stream 170 looking to detect and/or identify software processed viruses 150. Either in parallel or serially, virus co-processor 110 may perform one or more virus scans in relation to the data in data stream 170 looking to detect and/or identify hardware processed viruses 160. When virus co-processor 110 finishes operating on the data of data stream 170, it provides any results to general purpose processor 120. General purpose processor 120 may then execute instructions of virus software 140 that combines any results obtained in relation to software processed viruses 150 with the results of hardware processed viruses 160 obtained from virus co-processor. As one of many advantages, use of virus-co-processor 110 may increase the rate at which virus processing may be performed. Alternatively or in addition, providing for both software and hardware processing of viruses may increase the flexibility of system 100. As yet another alternative or addition, providing hardware virus processing may offload operational requirements from general purpose processor 120 such that any impact of virus processing is reduced. Based on the disclosure provided herein, one of ordinary skill in the art will recognize a variety of other advantages that may be achieved in accordance with different embodiments of the present invention.

Figure 2:
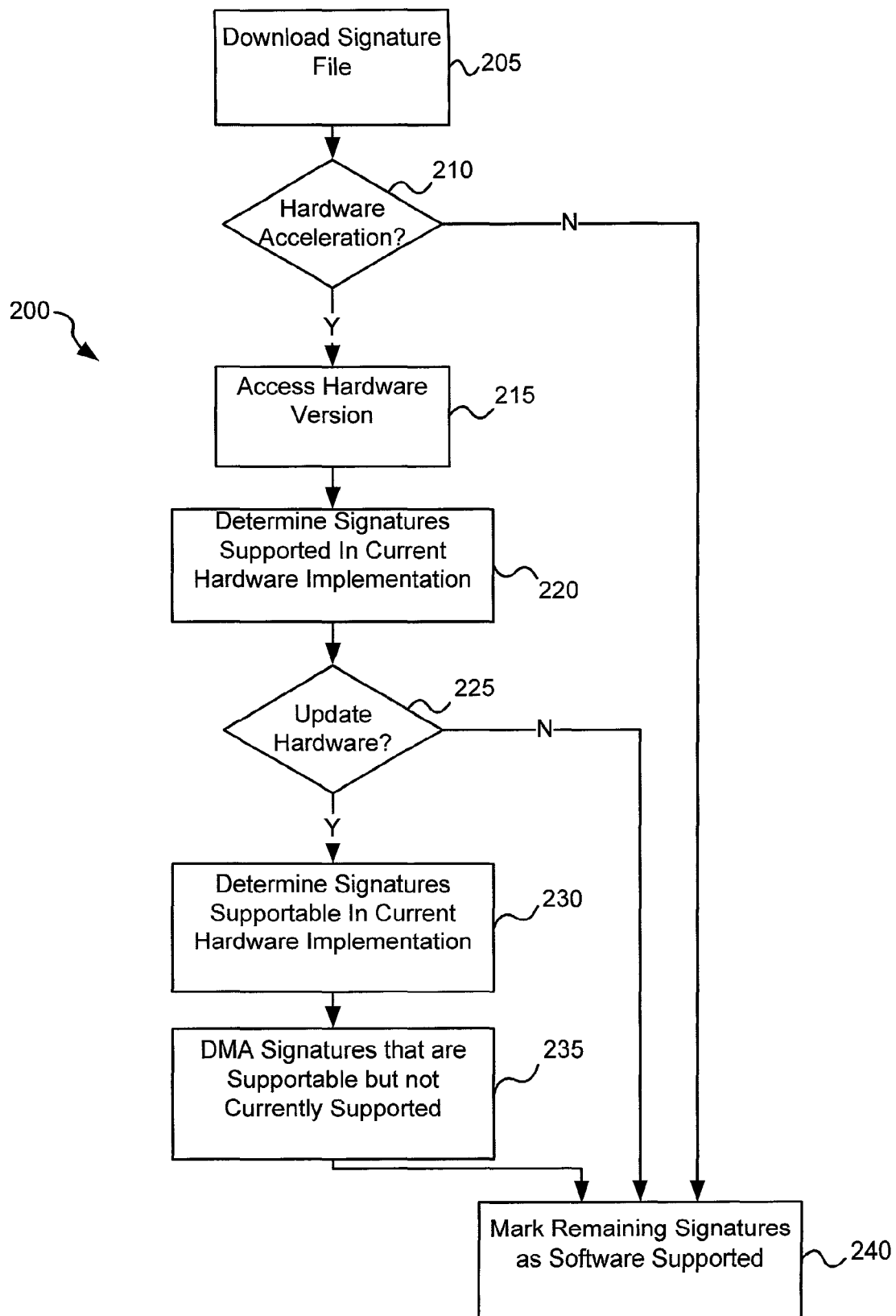
FIG. 2 is a flow diagram depicting a process for preparing bifurcated hardware and software virus processing in accordance with various embodiments of the present invention.

Turning to FIG. 2, a flow diagram 200 depicts a process for preparing bifurcated hardware and software virus processing in accordance with various embodiments of the present invention. Following flow diagram 200, a signature file is initially downloaded (block 205). Such a signature file includes a number of instructions capable of detecting and identifying a variety of known viruses and may be embodied in, for example, virus software 140. The aforementioned download may include, but is not limited to, downloading virus software 140 to a memory accessible to general purpose processor 120. In such a case, virus software 140 may include instructions executable by general purpose processor 120 for detecting and/or identifying various viruses, and other instructions executable by virus co-processor 110 to detect and/or identify the same viruses. In this way, virus software 140 may provide for detection and/or identification of a particular virus or set of viruses through either software processing or hardware processing. In one particular embodiment of the present invention, virus software 140 is compiled in two versions—a software version and a hardware version. In some cases, two different compilers are used—one to compile the hardware version and another directed at the software version. The compiled hardware version is loaded into a memory associated with the virus co-processor using a DMA transfer under the control of the general purpose processor, and the software version is loaded into memory associated with the general purpose processor.

It is determined whether hardware acceleration of virus processing is supported by the particular system to which the signature file is downloaded (block 210). Such hardware support may be provided by, for example, virus co-processor 110. Where hardware acceleration is not available (block 210), all virus detection is performed though execution of software instructions on a general purpose processor (block 240). Thus, for example, where the system executing virus software 140 does not include virus co-processor 110, all virus detection is performed through execution of virus software 140 on general purpose processor 120.

Alternatively, where it is determined that hardware acceleration is available (block 210), it is determined which version of hardware is included (block 215). This may include, but is not limited to, determining a version of an integrated circuit in which a virus co-processor is implemented and/or determining a version of virus signatures that are currently available to a virus co-processor. This may be accomplished through execution of a software instruction on the general purpose processor that issues a query to one or both of a virus co-processor and a memory associated with the virus co-processor. Based on the aforementioned version determination (block 215), it is determined which virus signatures (i.e., which viruses that may be processed) that are currently supported by the hardware accelerator (block 220). This may include, for example, determining which viruses may currently be detected by an associated virus co-processor. This process of determination may be performed by, for example, execution of instructions included in virus software 140 that compare version numbers against groups of known viruses.

It is next determined whether the hardware accelerator is to be updated to include an expanded list of supported virus processing (block 225). Where the hardware accelerator is not to be updated (block 225), only the viruses currently supported by the hardware accelerator are processed in hardware while all other viruses are processed in software (block 240). In some cases, all viruses known to virus software 140 may be supported by virus co-processor 110. In such a case, no viruses will be processed directly by general purpose processor 120. In other cases, only some of the viruses known to virus software 140 are supported by virus co-processor 110. In such a case, some viruses will be processed in hardware and others will be processed in software.

Alternatively, where the hardware accelerator is to be updated (block 225), it is determined which of the virus signatures can be supported by the particular version of the hardware accelerator (block 230). Where, for example, the hardware accelerator is virus co-processor 110, it is determined which of the virus signatures known to virus software 140 could be processed using virus co-processor 110. In some cases, all of the viruses can be processed by virus co-processor 110, and in other cases, less than all of the viruses may be supportable. Virus signatures for the supportable viruses are then transferred to the hardware accelerator using a direct memory access initiated by the general purpose processor (block 235). This causes an increase in the number of viruses that may be detected by the hardware accelerator. At this point, virus processing may be performed with the hardware accelerator processing all of the viruses that it is capable of supporting, and the general purpose processor performing software processing on all of the remaining viruses. In some cases, all viruses known to virus software 140 may be supported by, for example, virus co-processor 110. In such a case, no viruses will be processed directly by general purpose processor 120. In other cases, only some of the viruses known to virus software 140 are supported by virus co-processor 110. In such a case, some viruses will be processed in hardware and others will be processed in software.

Figure 3:
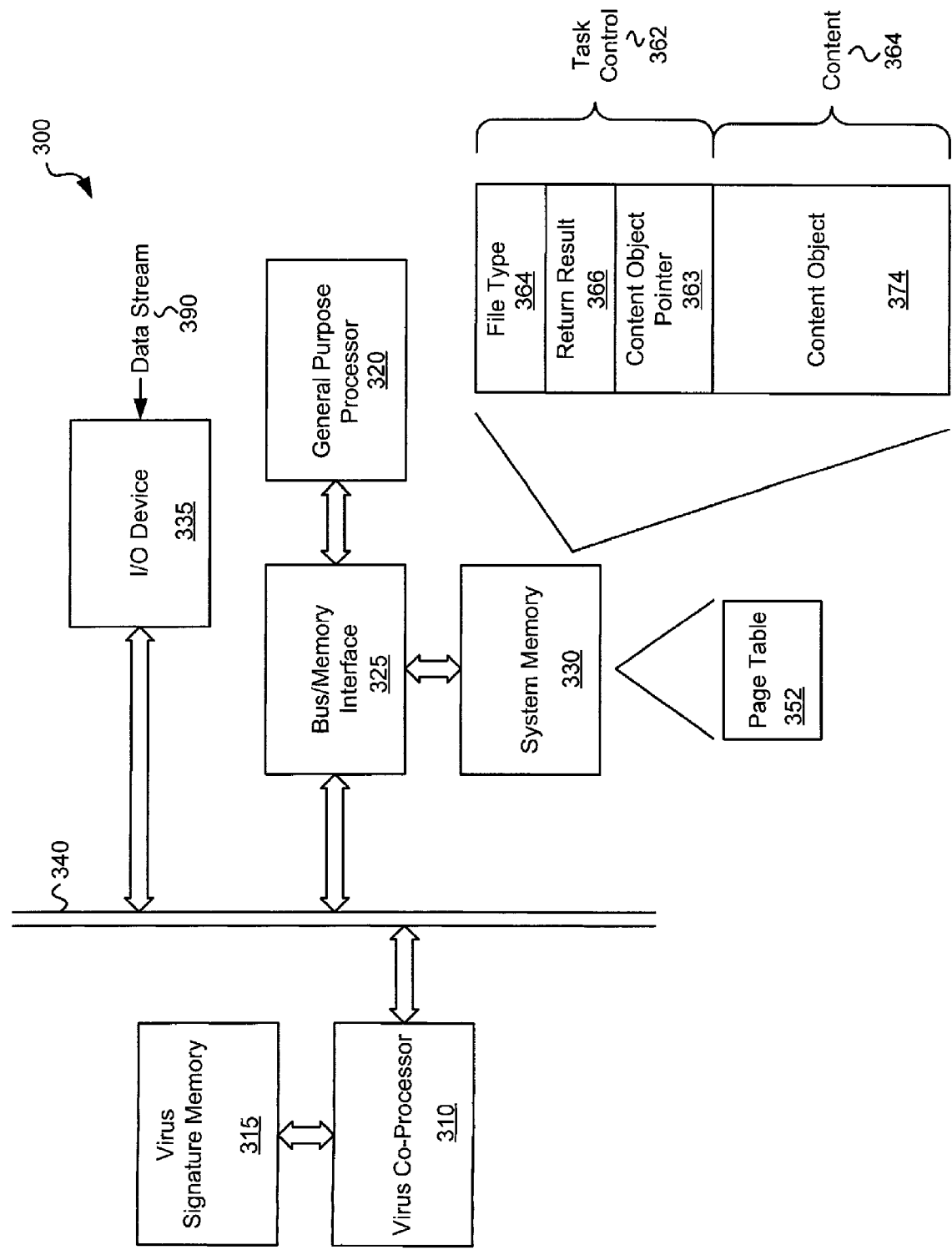
FIG. 3 shows a virus processing system in accordance with one or more embodiments of the present invention.

Turning to FIG. 3, a virus processing system 300 in accordance with one or more embodiments of the present invention is depicted. Virus processing system includes a virus processing hardware accelerator embodied as virus co-processor 310, and a general purpose processor 320. General purpose processor 320 may be any processor that is tailored for executing software commands indicated by an operating system. Thus, for example, general purpose processor may be, but is not limited to the various processors currently found in personal computers such as those offered by Intel and AMD. In contrast, virus co-processor 310 is tailored for performing one or more functions under the control of or at the request of general purpose processor 320. Such functions include, but are not limited to, virus detection and/or virus identification of a particular subset of viruses that may be processed by virus co-processor 310. Other viruses that are not supported by virus co-processor 310 may be processed by general purpose processor 320. In one particular embodiment of the present invention, general purpose processor 320 is a generally available Intel processor. Based on the disclosure provided herein, one of ordinary skill in the art will recognize a variety of general purpose processors that may be used in relation to different embodiments of the present invention. Virus co-processor 310 may be implemented as a semiconductor device such as, for example, a programmable gate array or an application specific integrated circuit. Based on the disclosure provided herein, one of ordinary skill in the art will recognize a variety of technologies that may be used to implement virus co-processor 310.

Virus co-processor 310 is associated with a local virus signature memory 315. Virus signature memory 315 may be integrated onto an integrated circuit implementing virus co-processor 310. Alternatively, or in addition, virus signature memory 315 may be implemented using an off-chip memory.

Such a memory may be, but is not limited to, a flash memory, a cache memory, a random access memory, a read only memory, an optical memory, a hard disk drive, combinations of the aforementioned, and/or the like. Based on the disclosure provided herein, one of ordinary skill in the art will recognize of variety of memory types that may be utilized in relation to different embodiments of the present invention.

A bus/memory interface 325 provides control for an interconnect bus 340 and access to a system memory 330. In particular embodiments of the present invention, interconnect bus 340 is a PCI bus, memory 330 is a random access memory 330, and bus/memory interface 325 is a chipset currently available for controlling the PCI bus and providing access to system memory 330. It should be noted that interconnect bus 340 may be, but is not limited to, a PCI interface, a PCIX interface, a PCIe interface, or an HT interface.

System memory 330 may be, but is not limited to, a flash memory, a cache memory, a random access memory, an optical memory, a hard disk drive, combinations of the aforementioned, and/or the like. System memory 330 includes, but is not limited to, a task control 362, a page table 352 and content 364. Content 364 includes one or more content objects 374 that are identified in task control 362. As shown, only a single content object is included, but it should be noted that two or more content objects may be maintained simultaneously in system memory 330. As used herein, the phrase "content object" is used in its broadest sense to mean and set of information. Thus, for example, a content object may be an email message, a word processing document, a video stream, an audio stream, combinations of the aforementioned, and/or the like. Page table 352 include page information used by general purpose processor 320 and virus co-processor 310 to perform virtual address access to/from system memory 330. Task control 362 includes a file type indicator 364 for each of the content objects in content 364. Thus, where a content object is a word processing file, the associated file type included in task control 362 would indicate that the content object is a word processing file. In addition, task control 362 includes pointers 368 to each of the associated content objects included in content 364. Further, task control 362 includes a return result location that may be used by virus co-processor 310 to write any virus scan results. The file type indicator may be used to select a certain subset of virus signatures that will be executed against the particular file. For example, there may be a number of virus signatures that are relevant to a word processing file, and others that are not relevant to word processing files. In such a case where an incoming file is a word processing file, only the signatures relevant to a word processing file type are executed against the file. This approach reduces the processing power that must be applied to a given file, while at the same time providing a reasonably thorough virus scan. It should be noted that the phrase "file type" is used in its broadest sense to mean a class into which a file may be assigned. Thus, a file type may indicate a type of file, a string type, a macro type or the like. In some cases, a file may be identified as being associated with two or more file types. As some examples, a file type may be, but is not limited to, a proprietary file type such as a particular word processing document type, an executable file, a macro file, a text file, a string. Based on the disclosure provided herein, one of ordinary skill in the art will recognize a variety of file types that may be identified in accordance with different embodiments of the present invention.

Virus processing system 300 further includes an I/O device 335. I/O device 335 may be any device capable of receiving information for and providing information from virus processing system 300. Thus, I/O device 335 may be, but is not limited to a USB communication device or an Ethernet communication device. In some cases, I/O device 335 may be integrated with either general purpose processor 320 or virus co-processor 310. Based on the disclosure provided herein, one of ordinary skill in the art will recognize a myriad of I/O devices that may be used in relation to virus processing system 300.

General purpose processor 320 is communicably coupled to virus co-processor 310 and I/O device 335 via interconnect bus 340. Bus/memory interface 325 provides access to/from system memory to each of general purpose processor 320, virus co-processor 310 and I/O device 335. It should be noted that the architecture of virus processing system 300 is exemplary and that one of ordinary skill in the art will recognize a variety of architectures that may be employed to perform virus processing in accordance with various embodiments of the present invention.

In operation, virus co-processor 310 is programmed or otherwise enabled to detect and/or identify viruses. Such programming includes transferring compiled virus signatures from system memory 330 to virus signature memory 315 using a direct memory transfer under the control of general purpose processor 320. These virus signatures may then be executed locally by virus co-processor 310. Based on the disclosure provided herein, one of ordinary skill in the art will recognize a variety of mechanisms that may be used to store virus signatures to virus signature memory in relation to one or more embodiments of the present invention.

A data stream 390 is received via I/O device 335. A content object incorporated in the data stream is stored to system memory 330 as content 364. This storage may be accomplished directly by I/O device 335 or indirectly under the control of general purpose processor 320. General purpose processor 320 accesses the received data and determines what type of file the data is associated with. Upon making its determination, general purpose processor 320 records the file type in task control 362, file type 364; and records a pointer to the location in system memory 330 where the content object is stored. This process of identifying the file type and content object pointer is generally referred to herein as virus preprocessing.

At this point, general purpose processor 320 may actively indicate to virus co-processor 310 that a content object is available for processing. Such active indication may be accomplished by, for example, asserting an interrupt. As another example, such active indication may include general purpose processor 320 writing a value or flag to virus co-processor 310 that cause virus co-processor 310 to start processing. Alternatively, general purpose processor 320 may passively indicate to virus co-processor 310 that a content object is available for processing. Such passive indication may be accomplished by, for example, setting a flag as part of task control 362. The aforementioned flag setting may include writing a task queue pointer to indicate that a new task is ready for processing. Virus co-processor 310 is then responsible for polling the flag to determine the availability of a content object for processing. Based on the disclosure provided herein, one of ordinary skill in the art will recognize a variety of mechanisms that may be used to alert virus co-processor 310 of a content object that is ready for processing.

Virus co-processor 310 accesses task control 362 and pulls both file type 364 and content object pointer 368 associated with the content object that is to be processed. Virus co-processor 310 uses file type 364 to determine which virus signatures included in virus signature memory 315 that are relevant to the particular file type. Thus, for example, where the file type indicates that content object 374 is a word processing document, only virus signatures associated with viruses known to attach to word processing documents are considered. Thus, by using file type 364, the number of virus signatures that will be executed by virus co-processor 310 may be substantially reduced without any significant impact on the accuracy of the performed virus processing. Such a reduction in the number of virus signatures can result in a substantial savings in the amount of processing that must be performed.

Virus co-processor 310 uses the retrieved content object pointer 368 to access content object 374 from system memory 330. In turn, virus co-processor executes the virus signatures from virus signature memory 315 that are relevant to file type 364. This may include executing a number of pattern comparisons to determine whether one or more viruses have attached to content object 374. Once all of the relevant virus signatures have been executed against content object 374, a result is written by virus co-processor 310 to task control 362 at the result location (i.e., return result 366). Such a result may indicate that content object 374 is free of any viruses where all virus signatures passed, or may indicate one or more viruses attached to content object 374 corresponding to failures of virus signatures executed against content object 374. In particular, where all of the signatures are executed against the file and no matches are indicated, a result is returned indicating that the file is clean (i.e., not infected by any virus known to virus co-processor 310). Alternatively, a match indicates that the file may be infected by a virus corresponding to the signature that generated the match. In such a case, the returned result indicates the one or more possible infections. Based on the disclosure provided herein, one of ordinary skill in the art will recognize a variety of resulting encodings that may be written to task control 362 to indicate various status being returned by virus co-processor 310 that may be used in relation to various embodiments of the present invention.

At this point, virus co-processor 310 may actively indicate to general purpose processor 320 that results of a virus scan are available. Again, such active indication may be accomplished by, for example, asserting an interrupt. Alternatively, virus co-processor 310 may passively indicate to general purpose processor 320 that virus processing results are available. Again, such passive indication may be accomplished by, for example, setting a flag as part of task control 362. General purpose processor 320 is then responsible for polling the flag to determine the availability of results. Based on the disclosure provided herein, one of ordinary skill in the art will recognize a variety of mechanisms that may be used to alert general purpose processor 320 of an available result. General purpose processor 320 may use the result to effectively address the virus threat if any. For example, general purpose processor 320 may clean an identified virus or it may quarantine or delete the infected content object. Based on the disclosure provided herein, one of ordinary skill in the art will recognize a variety of operations that may be performed in relation to a content object identified as infected.

Figure 4:
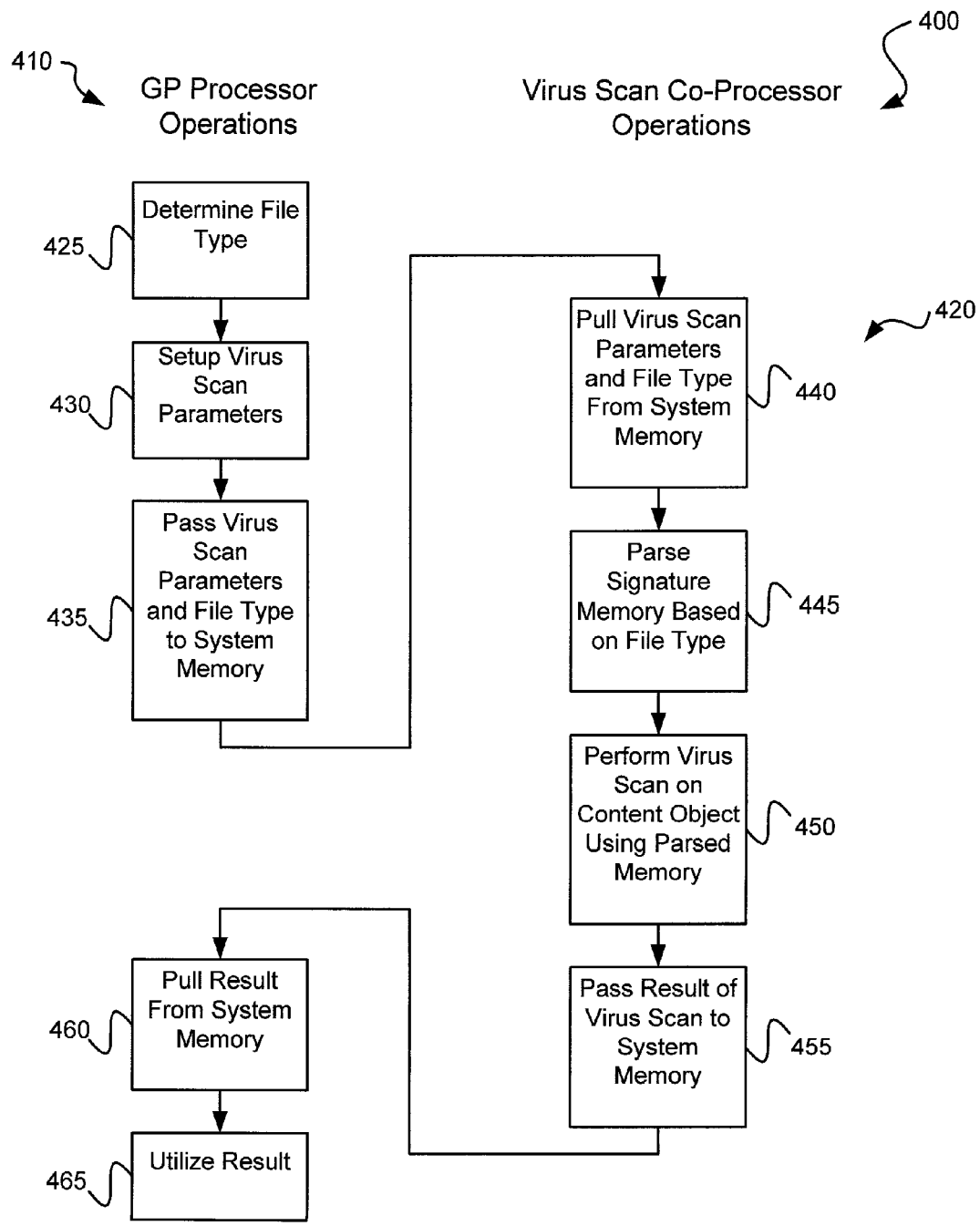
FIG. 4 is a flow diagram showing a process of virus processing in accordance with various embodiments of the present invention.

Turning to FIG. 4, a flow diagram 400 shows a process of virus processing in accordance with various embodiments of the present invention. Of note, the processes of flow diagram 400 are shown in two columns—a left column 410 indicating operations performed by a general purpose processor, and a right column 420 indicating operations performed by a virus co-processor. It should be noted that the operational differentiation between the general purpose processor and the virus co-processor may be modified in different embodiments of the present invention.

Following flow diagram 400, a general purpose processor receives a content object and determines what type of file the content object represents (block 425). The general purpose processor then sets up various virus scan parameters (block 430). The virus scan parameters are then passed to a system memory accessible to a virus co-processor (block 435). This may include, for example, writing a pointer to the content object and the file type of the content object to a task control location in the system memory.

The virus scan parameters are then accessed from the system memory by the virus co-processor (block 440). This may include, for example, reading a content object pointer and a file type message from the system memory. The virus signatures accessible to the virus co-processor are then parsed to select only the virus signatures that are relevant to the file type indicated in the file type message read from the system memory (block 445). The content object pointed by the content object pointer read from the system memory is then compared with known viruses by executing the identified virus signatures (block 450). The results of executing the virus signatures are then written to the system memory (block 455). The general purpose processor then pulls the results from the system memory (block 460), and utilizes the results (block 465). The general purpose processor may use the result to effectively address the virus threat if any. For example, the general purpose processor may clean an identified virus or it may quarantine or delete the infected content object. Based on the disclosure provided herein, one of ordinary skill in the art will recognize a variety of operations that may be performed in relation to a content object identified as infected.

Figure 5:
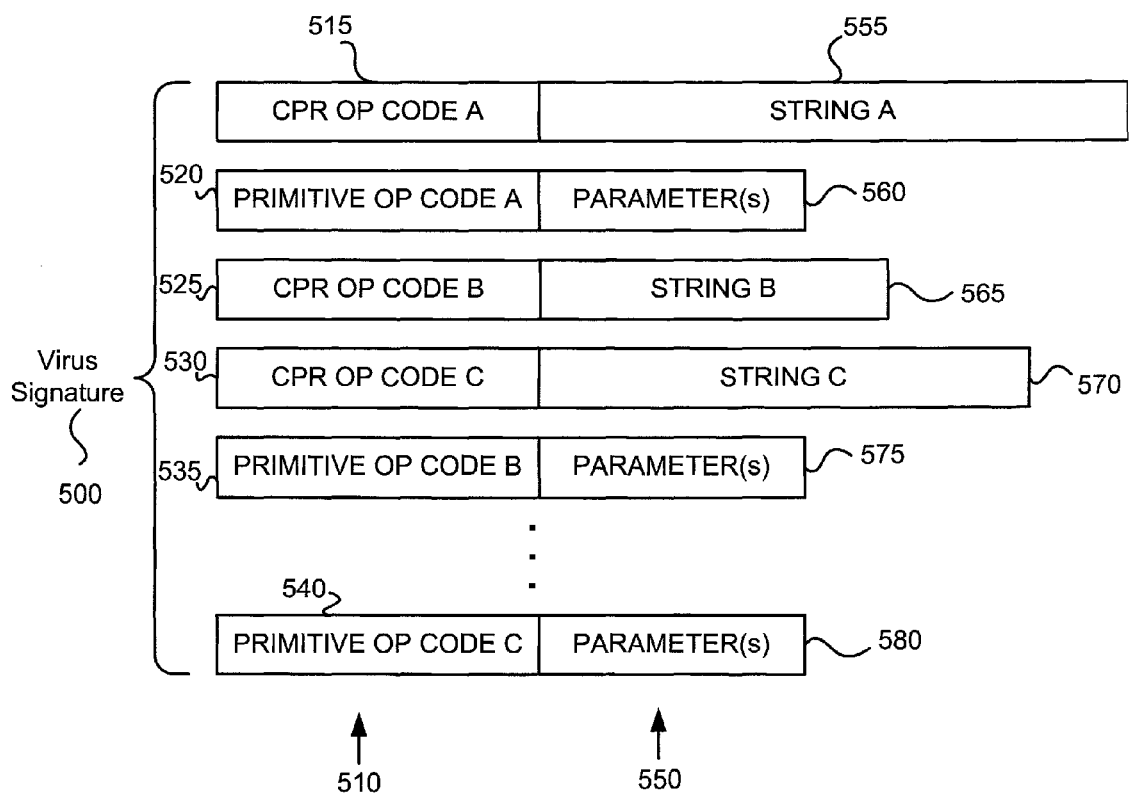
FIG. 5 depicts an exemplary virus signature that may be executed by a virus co-processor in accordance with some embodiments of the present invention.

Turning to FIG. 5, an exemplary virus signature 500 is shown that may be executed by a virus co-processor in accordance with some embodiments of the present invention. A shown, exemplary virus signature 500 includes a number of op-codes 510 that may each be associated with a particular string or set of parameters 550. In particular, exemplary virus signature 500 includes a first instruction including a Content Pattern Recognition ("CPR") op-code 515 and a string 555; a second instruction including a primitive op-code 520 and a parameter(s) 560; a third instruction including a CPR op-code 525 and a string 565; a fourth instruction including a CPR op-code 530 and a string 570; a fifth instruction including a primitive op-code 535 and a parameter(s) 575; and a sixth instruction including a primitive op-code 540 and a parameter(s) 580. Exemplary virus signature would be created to perform a number of functions that together identify a particular virus pattern in association with a content object. Thus, for example, the strings may be patterns that are known to exist when a particular pattern is present. The op-codes may, for example, cause the individual strings to be compared against a content object in a particular order such that the presence or absence of a given virus may be confirmed in relation to a particular content object. It should be noted that exemplary virus signature represents a number of possible virus signatures that may be developed and utilized in relation to different embodiments of the present invention. Such virus signatures may include as few as one instruction or as many as thousands of instructions depending upon the particular implementation and the virus that the particular virus signature is intended to detect.

The aforementioned CPR op-codes are generally referred to as complex instructions, and the primitive op-codes are generally referred to as simple instructions. In some embodiments of the present invention, the complex instructions and the simple instructions are executed using separate processing pipes. This architecture is more fully described below in relation to FIG. 7.

One example of a CPR instruction set is described in U.S. patent application Ser. No. 10/624,452, entitled "Content Pattern Recognition Language Processor and Methods of Using the Same" that was filed on Jul. 21, 2003 by Wells et al. The entirety of the aforementioned patent application is incorporated herein by reference for all purposes. Another example of a CPR instruction set is included in Table 1 below which shows hardware encoding, and an example of a primitive instruction set forth in Table 2.

TABLE 1

Virus Co-Processor Supported CPR Op-Codes

| CPR Op-Code | Byte code | Length (byte) | Description |
|---|---|---|---|
| !(predicate (arguments)) | DD | 1 | This predicate exists only as a prefix for another predicate. It reverses the true or false return (flag) of the previous predicate when EOBF and SEF are zero. |
| A("string") | 00 len string | >=3 | compare text string, it matches a string that starts at the current location. |
| A(byte range, "string") | 01 len range string | >=4 | It searches from the current buffer pointer location for the first occurrence of the string literal within range |
| A(long start offset, long range, string) | 02 len longoffset longrange string | >=11 | It searches from the provided start offset for the first occurrence of the string literal within range |
| A(ALL, "string") | 03 len string | >=3 | It searches the entire buffer from the start looking for the first occurrence of the string literal. |
| A(long range, "string") | 04 len longrange string | >=7 | It searches from the current buffer pointer location for the first occurrence of the string literal within range |
| bitmask B(mask, byte) | 0A mask byte | 3 | simply applies the mask to the next byte in the buffer and compares it to byte |
| case C(B1, L1, B2, L2 . . . , Bn, Ln) | 14 len B1, L1, B2, L2, . . . , Bn, Ln (L is two bytes) | 4, 6, 8 . . . | comparing the next byte in the buffer with a series of bytes. Each byte in the series is followed by a label byte. If any byte matches, the signature pointer moves to the related label in the sig., If none of the bytes in the series match then the signature fails |
| checksum CKM(<number of bytes>, <checksum value>) | 19 NUM CHKSUM (NUM is two bytes unsigned) (CHKSUM is four bytes) | 7 | calculates the checksum of next <number of bytes> in the buffer, and compare to <checksum value>. Return true if the values match and false otherwise. It fails if there are less than <number of bytes> left in the buffer |
| Goto G(Ln) | 3C shortoffset | 3 | move the signature pointer to a new location specified by label which is an unsigned short (2 bytes) as the forward reference |
| Return true G(true) | 3D | 1 | It terminates and returns true |
| Return false G(false) | 3E | 1 | It terminates and returns false if previous predicate return false |
| H (heuristic flag) | Subroutine | | Tests heuristic flags with the four byte flag which is a integer bitmask (logic and) |
| I(test, label) | 50 test L1 | 4 | comparing the next byte in the buffer with a argument byte. If the bytes match then the signature pointer is moved to the label location and processing continues |
| I(Predicate, label) | 51 Predicate 51 label | >=5 | If the predicate match then the signature pointer is moved to the label location and processing continues, otherwise SP continue. |
| Jump J(byte) | 58 | 1 | moving Buffer Pointer to a relative location before or after the current buffer position by the byte in buffer |
| J(word) | 59 | 1 | moving Buffer Pointer to a relative location before or after the current buffer position by the word in buffer |
| J(dword) | Subroutine | | moving Buffer Pointer to a relative location before or after the current buffer position by the Dword in buffer |
| J(IF_LAST) | Subroutine | | Dword is read from buffer and compared to the virtual ranges of the different sections of a PE file. If it lands in the last section then it will be followed, otherwise the jump predicate will fall through to the next predicate in the signature |
| J(ABS, <jump_type>) | Subroutine | | The predicate is used for some viruses that precalculate the jump offset. Instead of using the next buffer data as address for calculating the offset the offset is used directly. |
| Literal L(stream) | 6E len stream | >=3 | It tests the buffer stream starting at the current location with the literal byte stream, the first argument is the number of bytes in the stream |
| L(byte range, stream) | 6F len range stream | >=4 | It tests the buffer stream starting at the current location within range with the literal byte stream, the first argument is the an unsigned byte value show the range |
| L(long start offset, long range, stream) | 70 len start_off range stream | >=11 | It searches from the provided long start offset for the first occurrence of the byte stream within long range |
| L(ALL, stream) | 71 len stream | >=3 | It tests all buffer with the literal byte stream, the first argument is the number of bytes in the stream |
| L(long range, stream) | 72 len long_range stream | >=9 | It tests the buffer stream starting at the current location within range with the literal byte stream, the first argument is the an unsigned byte value show the range |

TABLE 1-continued

Virus Co-Processor Supported CPR Op-Codes

| CPR Op-Code | Byte code | Length (byte) | Description |
| --- | --- | --- | --- |
| LOC (Operator, offset, <reference location>) | 77 reference_location Operator offset | 7 | compare the current buffer pointer to a reference location in the file Operator: unsigned byte Bytes: signed long which is offset of ref location reference location: unsigned byte |
| Rewind (Reset) R(byte) | B0 unsigned_offset | 2 | Reset the buffer pointer an unsigned offset within, and in relation to, the section of the buffer that starts at the signature start position |
| R(+/−byte) | B1 signed_offset | 2 | moves the buffer pointer a signed distance from the current buffer pointer location. That is it adds a signed value to the pointer |
| Seek S(n, SEEK_SET) | B4 long_offset | 5 | moves the buffer pointer a signed long offset within the buffer from beginning of buffer. (relative) |
| Seek S(n, SEEK_END) | B5 long_offset | 5 | moves the buffer pointer a signed long offset within the buffer from end of file. (relative) |
| Seek S(n, SEEK_CUR) | B6 long_offset | 5 | moves the buffer pointer a signed long offset within the buffer from current location (relative) |
| SZ (operator, filesize) or SZ (RG, <lower file size>, <upper file size>) | B9 operator filesize Or B9 RG lower_filesize upper_filesize | 6 or 10 | compare the size of the file (buffer) to a specified value with different operation file size, lower file size, upper file size (unsigned long) |
| Test T(AND) | BE byte byte | 3 | tests the next two bytes in buffer If both bytes are present in any order, then a match is returned |
| Test T(XOR) | BF byte byte | 3 | tests the next two bytes in buffer If one and only one bytes is present, then a match is returned |
| Test T(OR) | C0 len byte byte ... | 4, 5, 6, ... | tests a list of 2 or more bytes against the next single byte in the buffer. If the next buffer byte matches any bytes in the list a match is returned |
| Test T(NOT) | C1 len byte ... | 3, 4, 5, 6, ... | tests a list of 1 or more bytes against the next single byte in the buffer. If the next buffer byte matches any bytes in the list, return false |
| Uppercase U("string") | CD len string | >=3 | Like the A("string") predicate, just not case-sensitivity. The compiler should uppercase all the string inside U predicate. Hardware will convert all char to uppercase in the data buffer to compare with. |
| U(byte range, "string") | CE len range string | >=4 | |
| U(long start offset, long range, string) | CF len longoffset longrange string | >=11 | |
| U(ALL, "string") | D0 len string | >=3 | |
| U(long range, "string") | D1 len longrange string | >=7 | |
| Variable V(EQ, range, benchmark, byte_list) | D2 len benchmark range test_bytes | >=5 | Counts matches for one or more test bytes within a specified range, then compare with the benchmark, if EQ(equal), return TRUE |
| Variable V(GT, range, benchmark, byte_list) | D3 len benchmark range test_bytes | >=5 | Counts matches for one or more test bytes within a specified range, then compare with the benchmark, if GT(greater than), return TRUE |
| Variable V(LT, range, benchmark, byte_list) | D4 len benchmark range test_bytes | >=5 | Counts matches for one or more test bytes within a specified range, then compare with the benchmark, if LT(less than), return TRUE |
| Wildcard W(1) | D8 | 1 | simply skip(moves) the buffer pointer ahead 1 byte |
| W(2) | D9 | 1 | simply skip(moves) the buffer pointer ahead 2 bytes |
| W(n) | DA n | 2 | simply skip(moves) the buffer pointer ahead n bytes |
| W(n, byte) | DC n mbyte | 3 | check each byte for the next n bytes for a byte matching "mbyte". If no byte is found in range return false. Else return true and leave buffer pointer pointing to the byte after the matching byte. |
| Z(long) | DE length | 5 | The long value following the predicate identifier is compared to the "inset" value received from the calling program. If the two values are equal then continue with the signature, else return false. |

TABLE 2

Virus Co-Processor Primitive Op-Codes

| Primitive Op-Code | Parameter(s) | Length (byte) | Function |
| --- | --- | --- | --- |
| ADD | R1, R2, R3 | 4 | signed add two register's contents and load result to a register |
| ADDI | R1, R2 | 4 | signed add immediate value and one register's content and load result to a register |
| AND | R1, R2, R3 | 4 | AND two register's contents and load result to a register |
| ANDI | R1, R2 | 4 | AND immediate value and one register's contents and load result to a register |
| BIF | Flag | 4 | branch if flag set |
| BINF | Flag | 4 | branch if no flag set |
| JR | R1 | 4 | Jump to address in register |
| JAL | | 4 | Jump to immediate address and link original SP to GPR15 |
| JALR | R1, R2 | 4 | Jump to address in register and link original SP to general register |
| LDBS | R1, R2 | 4 | load data byte from memory which addressed by another register and sign extension |
| LDBZ | R1, R2 | 4 | load data byte from memory which addressed by another register and zero extension |
| LDWS | R1, R2 | 4 | load data word from memory which addressed by another register and sign extension |
| LDWZ | R1, R2 | 4 | load data word from memory which addressed by another register and zero extension |
| LDL | R1, R2 | 4 | load data long from memory which addressed by another register |
| MFSPR | R1 | 4 | move data from SPR to general register |
| MTSPR | R1 | 4 | move data to SPR from general register |
| MOVHI | R1 | 4 | load immediate data to Hi word of general register |
| NOP | | 1 | Non operations |
| OR | R1, R2, R3 | 4 | OR two register's contents and load result to a register |
| ORI | R1, R2 | 4 | OR immediate value and one register's contents and load result to a register |
| SFEQ | R1, R2 | 4 | Set Flag if equal with two general registers' contents |
| SFNE | R1, R2 | 4 | Set Flag if not equal with two general registers' contents |
| SFGES | Flag, R1, R2 | 4 | Set Flag if Great than or equal signed |
| SFGTS | Flag, R1, R2 | 4 | Set Flag if Great than signed |
| SFGEU | Flag, R1, R2 | 4 | Set Flag if Great than or equal unsigned |
| SFGTU | Flag, R1, R2 | 4 | Set Flag if Great than unsigned |
| SUB | R1, R2, R3 | 4 | subtract two register's contents and load result to a register |
| SDL | R1 | 4 | store data long to memory which addressed by another register |
| XOR | R1, R2, R3 | 4 | XOR two contents and load result to a register |

In embodiments of the present invention where separate hardware and software compilers are used, the hardware compiler may be tailored to prepare instructions for execution by the virus co-processor. In such a case, the hardware compiler may treat each virus signature which includes both CPR op-codes and primitive op-codes such that the compiled instructions intermingles the primitive and CPR op-codes. The fetch unit of the virus co-processor can be designed such that it is capable of dealing with intermixed CPR and primitive op-codes. In some cases, where the hardware compiler detects that a primitive op-code follows a CPR op-code, the compiler may add NOP instructions to enforce long-word alignment. In addition, the hardware compiler may add a termination code at the end of each virus signature to cause the virus co-processor to set the proper termination flags and to properly store results of the executed virus signature. Based on the disclosure provided herein, one of ordinary skill in the art will recognize a variety of compiler techniques that may be used in compiling virus signatures for execution by the virus co-processor.

Figure 6:
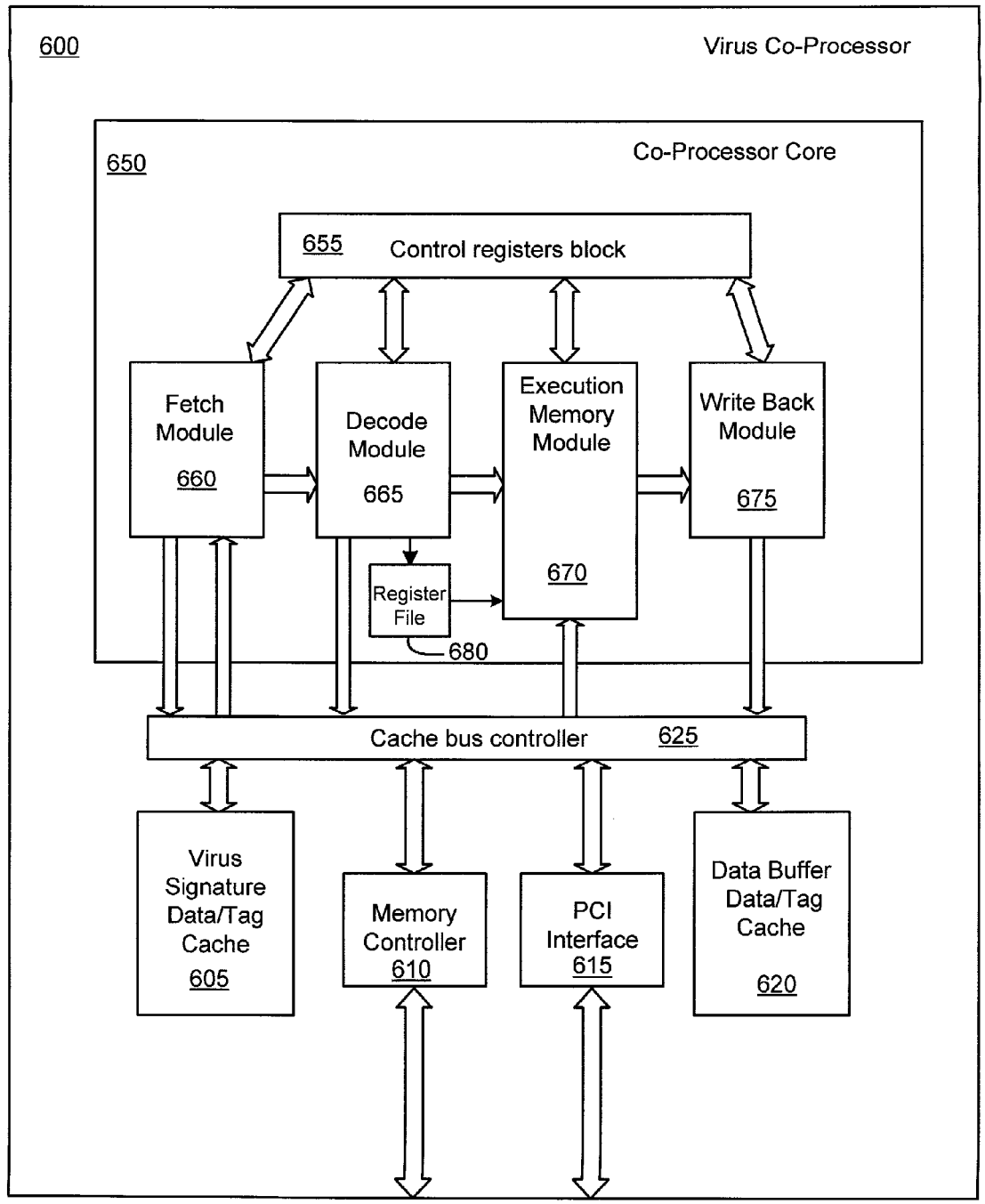
FIG. 6 is a general architecture of a virus co-processor that may be utilized in accordance with different embodiments of the present invention.

Turning to FIG. 6, a general architecture of a virus co-processor 600 that may be utilized in accordance with different embodiments of the present invention. Virus co-processor 600 is a dedicated hardware microstructure that is designed to increase the throughput of virus processing when compared with performing virus processing on a general purpose processor alone. Virus co-processor 600 includes a co-processor core 650 that has a four level instruction pipeline including a fetch module 660, a decode module 665, an execution memory module 670 and a write back module 675. In addition, co-processor core 650 includes a control registers block 655 and a register file 680.

Virus co-processor 600 further incorporates an interface that includes a cache bus controller 625 that provides for memory accesses via a virus signature cache 605 and a data buffer cache 620. Further, cache bus controller 625 provides for access to an external memory such as a virus signature memory via a memory controller 610. In addition, the interface includes a PCI interface 615.

In this particular embodiment of the present invention, virus co-processor 600 differs from a typical general purpose processor, among other things, a separate instruction and data cache and use of a Signature Pointer (SP) for instructions and another Buffer Pointer (BP) for data. In some cases, instructions (i.e., virus signatures) are accessed from a local virus signature memory via a dedicated memory bus (i.e., via memory controller 610) and data is accessed via the PCI bus (i.e., via PCI interface 615). Further, instructions of variable length are accessed together using a common fetch module (i.e., fetch module 660). Thus, it operates like a combination CISC and RISC processor where the CISC instructions are represented by CPR instructions and the RISC instructions are represented by primitive instructions. Subroutines (i.e., virus signatures) are executed in serial with a result returned at the end. Memory write back is limited to the conclusion of a virus signature. Based on the disclosure provided herein, one of ordinary skill in the art will recognize a variety of other differences between the different embodiments of virus co-processors discussed herein and typical general purpose processors. Further, one of ordinary skill in the art will recognize that not all of the aforementioned differences are necessarily incorporated into each embodiment of a virus co-processor according to the different embodiments of the present invention.

Figure 7:
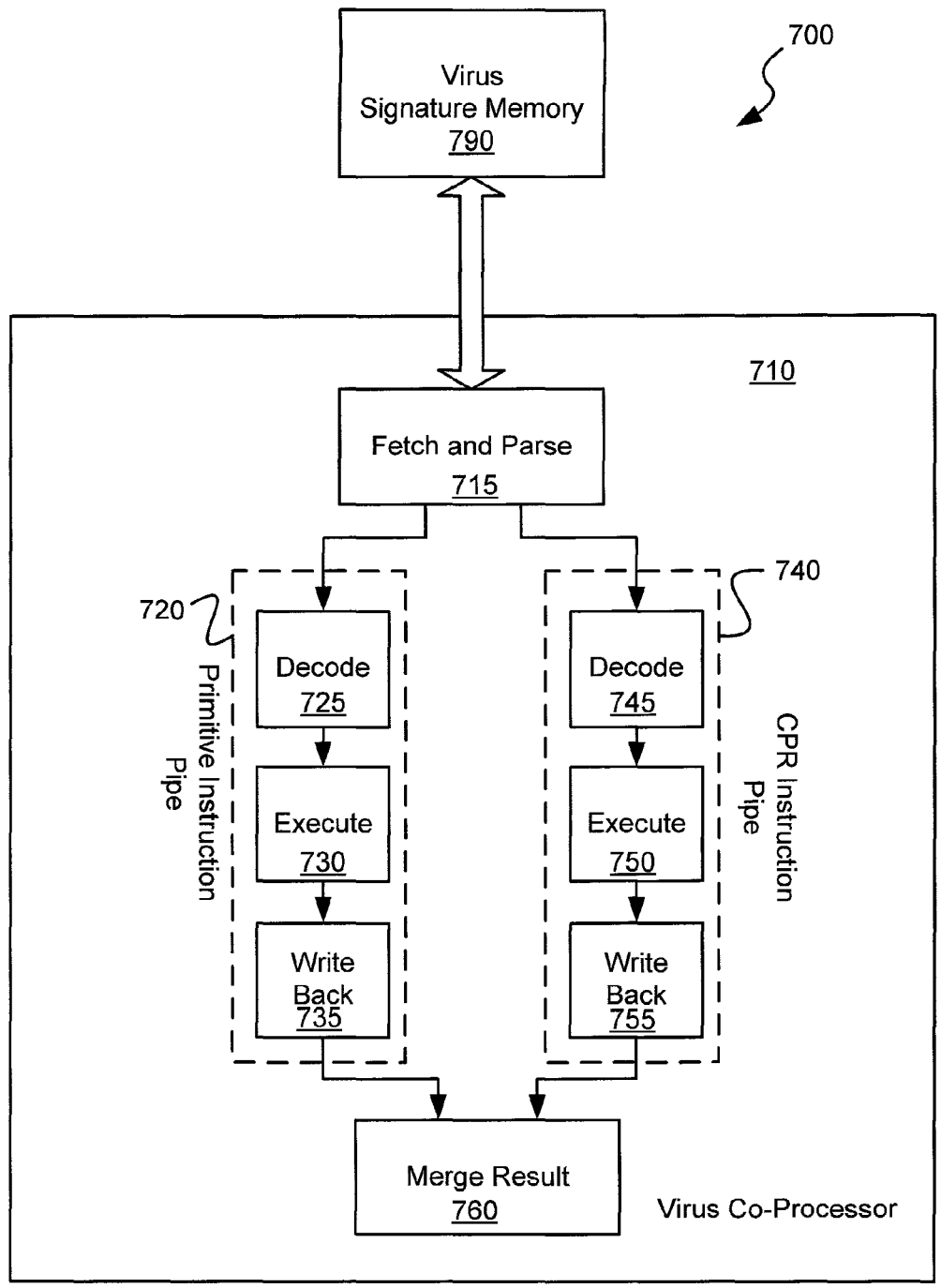
FIG. 7 shows a virus co-processing system including dual execution paths in accordance with some embodiments of the present.

Turning to FIG. 7, a virus co-processing system 700 including dual execution paths in accordance with different embodiments of the present invention is shown. Virus co-processing system includes a virus co-processor 710 and a virus signature memory 790. Virus signature memory 790 includes a number of virus signatures that include a combination of intermixed CPR op-codes and primitive op-codes. These intermixed op-codes are designed for serial operation to detect a particular virus that may have attached to a particular content object.

Virus co-processor 710 includes a unified fetch and parse module 715 that retrieves instructions from virus signature memory 790, parses the retrieved instructions, and feeds instructions to respective instruction pipes 720, 740. In particular, where a retrieved instruction is a primitive instruction, it is fed to primitive instruction pipe 720 for execution, and where a retrieved instruction is a CPR instruction it is fed to CPR instruction pipe 740 for execution. Primitive instruction pipe 720 is a three stage pipe including a decode unit 725, an execute unit 730 and a write back unit 735. CPR instruction pipe 740 is a three stage pipe including a decode unit 745, an execute unit 750 and a write back unit 755. A merge result module 760 may be included to appropriately combine the results from each of primitive instruction pipe 720 and CPR instruction pipe 740. In some cases, merger result module 760 may be eliminated where interlocks between primitive instruction pipe 720 and CPR instruction pipe 740 assure a completely serial execution of primitive and CPR op-codes. By interlocking the pipes the write back for each of the pipes should effectively perform the merge function. In such a case, write back units 735, 755 write the result from an executed instruction to memory in a particular order that effectively performs the function that would be performed by the non-existent merge result module 760.

In one particular embodiment of the present invention, unified fetch and parse module 715 is responsible for fetching instructions from the instruction cache when they are available in the cache, or from virus signature memory when they are not available in the cache. Unified fetch and parse module 715 may retrieve instructions from any byte boundary, and deliver the retrieved instructions to the respective instruction pipes aligned on instruction boundaries. In some cases, such a fetch module is capable of retrieving and aligning instructions that vary between one and two hundred, fifty-six bytes in length including the op-code and immediate data.

Figure 8A:
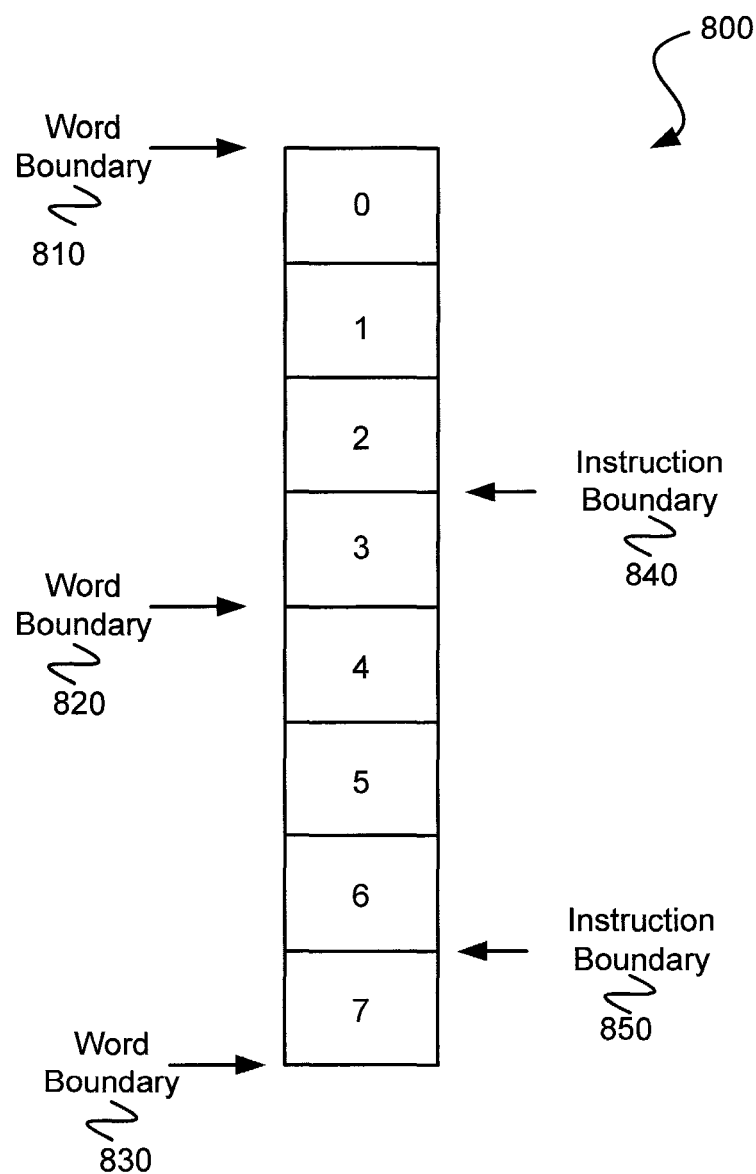
FIG. 8A depicts an eight byte pre-fetch shift buffer that may be used in accordance with different embodiments of the present invention to perform instruction alignment.

In some embodiments of the present invention, unified fetch and parse module 715 includes an instruction alignment module that works consistent with that discussed in relation to FIG. 8A. Turning to FIG. 8A, an eight byte pre-fetch shift buffer 800 is used to perform instruction alignment prior to sending instructions to the decode units of the respective instruction pipes 720, 740. As shown, a word boundary 810 precedes byte 0, another word boundary precedes byte 4, and yet another word boundary succeeds byte 7. Of note, an exemplary instruction boundary 840 does not align with any of word boundaries 810, 820, 830.

In operation, eight contiguous word aligned bytes are pulled from virus signature memory 790 (or from an associated cache where the bytes have been previously cached). The eight bytes are loaded into pre-fetch shift buffer 800. Unified fetch and parse module 715 queries the retrieved byte to identify any possible op-code. That op-code is then sent to the appropriate instruction pipe along with an expected amount of immediate data associated with the op-code. In sending the op-code, unified fetch and parse module 715 aligns the op-code and immediate data for execution by the selected instruction pipe.

Alternatively, unified fetch and parse module 715 may be ignorant to the inclusion of an op-code in pre-fetch shift buffer 800 or any alignment concerns. In such a case, the entire pre-fetch shift buffer 800 may be made available to the decoder in each of instruction pipes 720, 740. In such a case, each of the instruction pipes determines whether pre-fetch shift buffer 800 includes an instruction that they are to execute. In this case, the respective decode unit instructs pre-fetch shift buffer 800 about the size of each decoded instruction by asserting one or more interface signals indicating the number of bytes that are associated with the identified op-code. Unified fetch and parse module 715 continues pulling information from virus signature memory 790 into pre-fetch shift buffer 800 and the decode unit continually accesses the retrieved information until it has sufficient information to begin execution of the identified op-code.

Figure 8B:
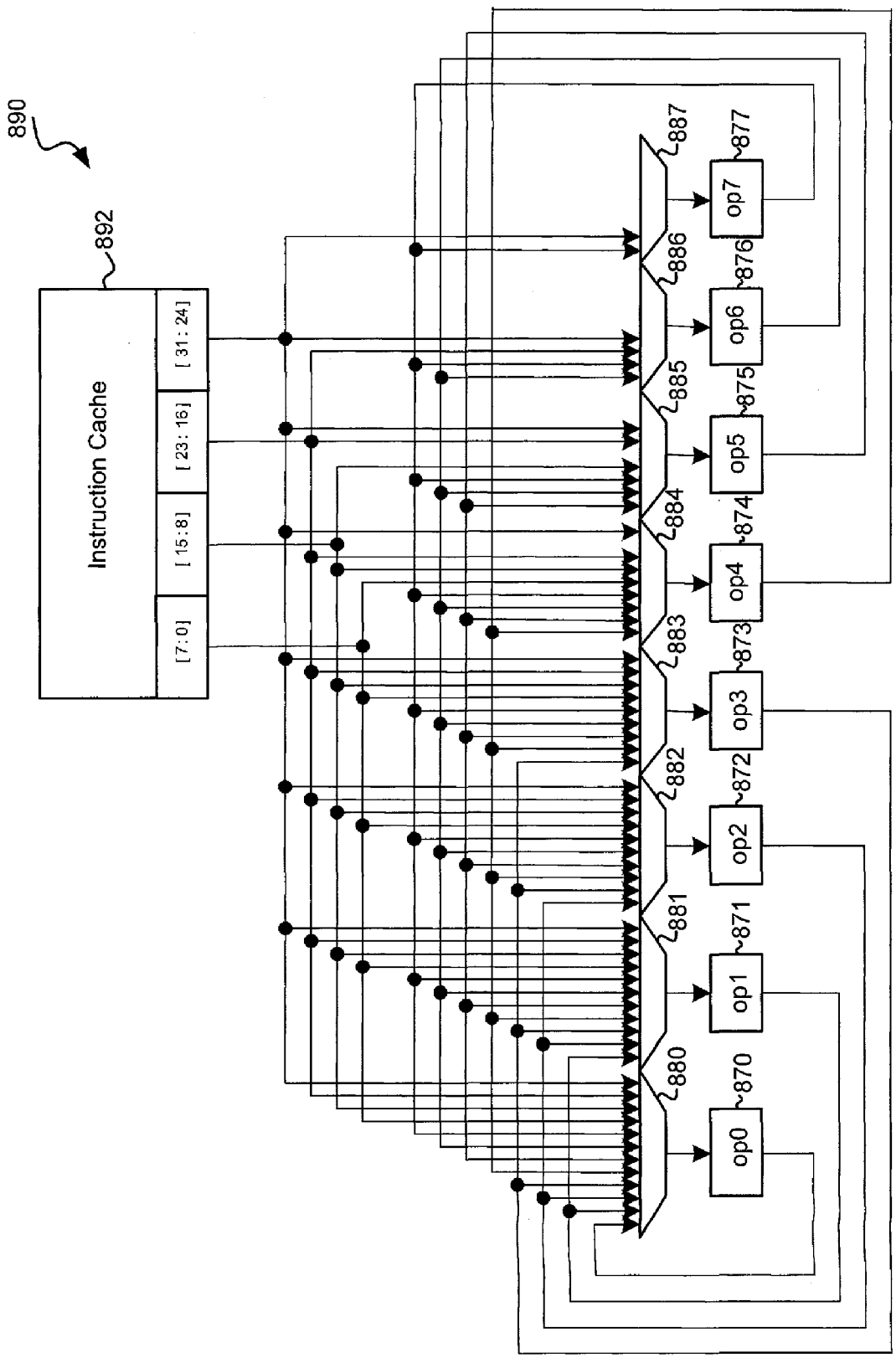
FIG. 8B shows an exemplary instruction alignment circuit that may be used in accordance with one or more embodiments of the present invention.

FIG. 8B shows an exemplary alignment circuit 890 that may be used in accordance with one or more embodiments of the present invention. As shown, alignment circuit 890 includes an instruction cache 892 that is capable of providing four bytes of data in parallel. This information is aligned into eight registers 870, 871, 872, 873, 874, 875, 876, 877 using multiplexers 880, 881, 882, 883, 884, 885, 886, 887. Thus, once an instruction boundary is identified, control can be applied to multiplexers 880, 881, 882, 883, 884, 885, 886, 887 such that subsequent accesses to instruction cache 892 are aligned to instruction boundaries. Based on the disclosure provided herein, one of ordinary skill in the art will recognize a variety of other circuits that may be utilized to provide data alignment in accordance with some embodiments of the present invention.

Referring back to FIG. 7, decode unit 725 is responsible for decoding primitive instructions, and decode unit 745 is responsible for decoding CPR instructions. Together, decode units 725, 745 are responsible for controlling the sequencing of intermixed CPR instructions and primitive instructions. In particular, when a multi-cycle CPR instruction is encountered by CPR instruction pipe 740, primitive instruction pipe 720 may be stalled to assure that the intermixed CPR instructions and primitive instructions proceed in order. Decode unit 745 breaks down multi-cycle CPR instructions into their micro-operations and transfer the microinstruction to execution unit 750. In addition, decode unit 745 calculates any branch or jumps based on various flags and/or op-codes. Decode units 725, 745 provide executable instructions to execution units 730, 750.

Figure 8C:
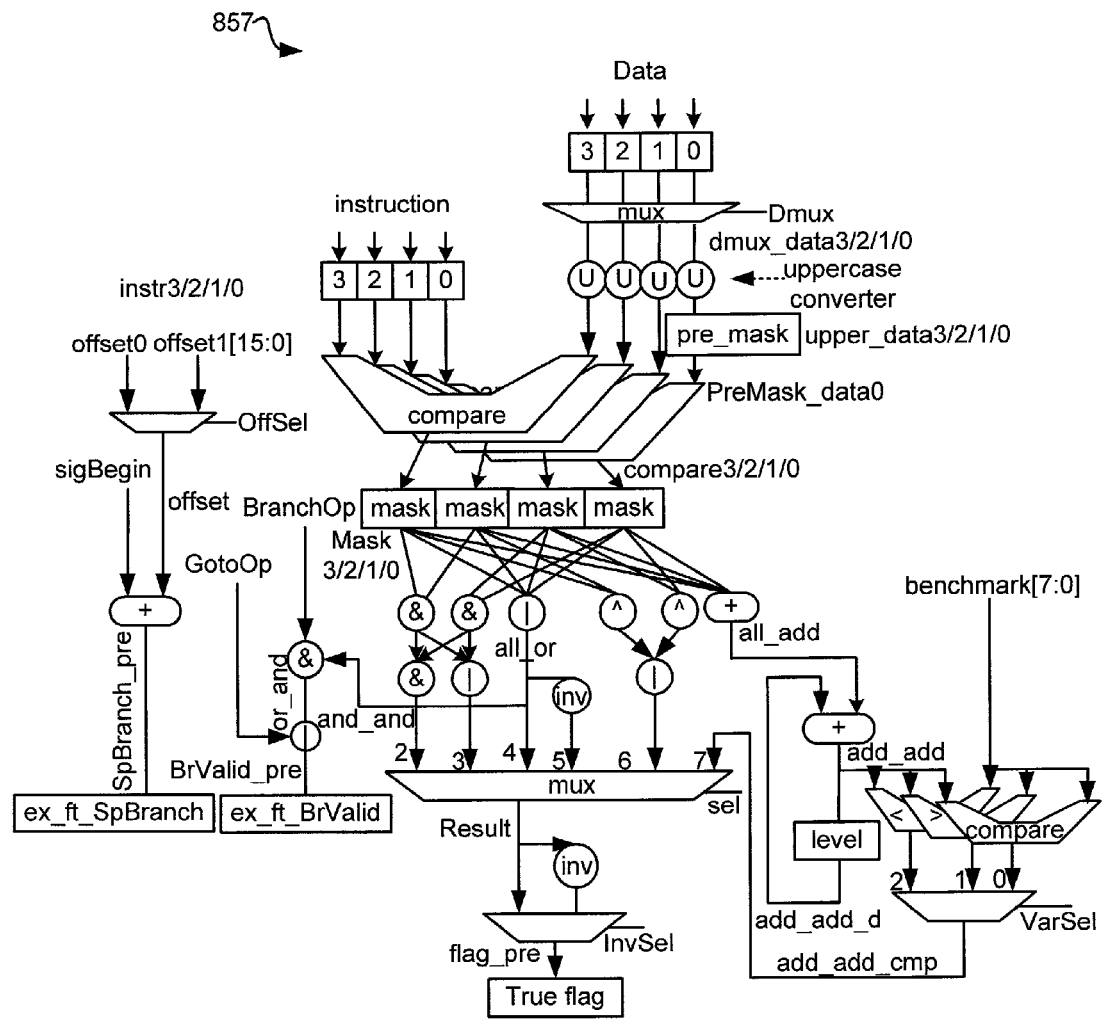
FIG. 8C depicts an exemplary execution unit that may be employed in relation to one or more embodiments of the present invention.

Execution units 730, 750 are responsible for performing actual data computations indicated by the particular op-codes. Execution units 730, 750 include a main computation ALU and shifter along with memory operation circuitry. FIG. 8C depicts an exemplary execution unit 857 that may be employed in relation to one or more embodiments of the present invention. Any memory data access may be based on a buffered address computed in the previously described decode units 725, 745. The data cache outputs the data to the execution unit. Most of the CPR instructions and primitive instructions involve comparison and logic operations, thus some embodiments of the present invention employ execution units that do not include a multiplier/divider circuit. As shown, exemplary execution unit 857 further includes temporary storage registers.

Figure 8D:
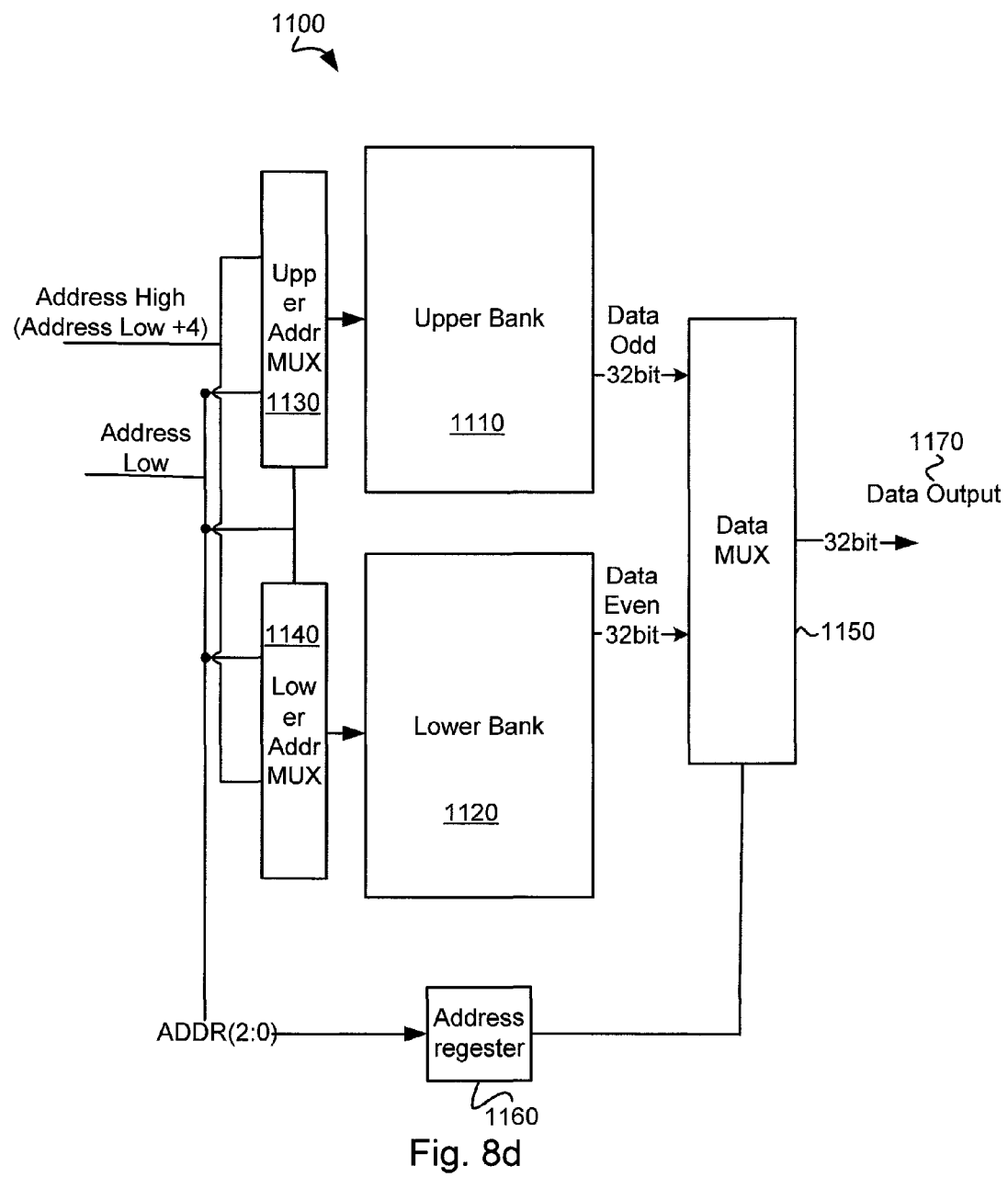
FIG. 8D shows an exemplary data alignment circuit that may be used in accordance with some embodiments of the present invention.

FIG. 8D shows an exemplary data fetch circuit 1100 is depicted. Data fetch circuit 1100 includes an upper bank 1110 and a lower bank 1120. An address is applied to upper bank 1110 via an upper address multiplexer 1130, and an address is applied to lower bank 1120 via a lower address multiplexer 1140. Upper bank 1110 contains data with odd DWORD addresses, and lower bank 1120 contains data with even DWORD addresses. Application of the appropriate address causes two long words (sixty-four bits) of data to be provided at the inputs of a data multiplexer 1150. The lower order bits of the applied address are registered using an address register 1160. The output of address register 1160 selects which bytes of the two long words that are used to drive a four byte data output 1170. In this way, alignment of otherwise misaligned data maybe achieved. In particular, where two long words of data are always retrieved, four bytes of data can be accessed and selected. This allows for a situation where the general purpose processor is not necessarily required to enforce long word alignment for data that is to be virus scanned. Based on the disclosure provided herein, on of ordinary skill in the art will recognize other approaches and/or circuits that may be used to perform data alignment in accordance with different embodiments of the present invention.

Figure 9:
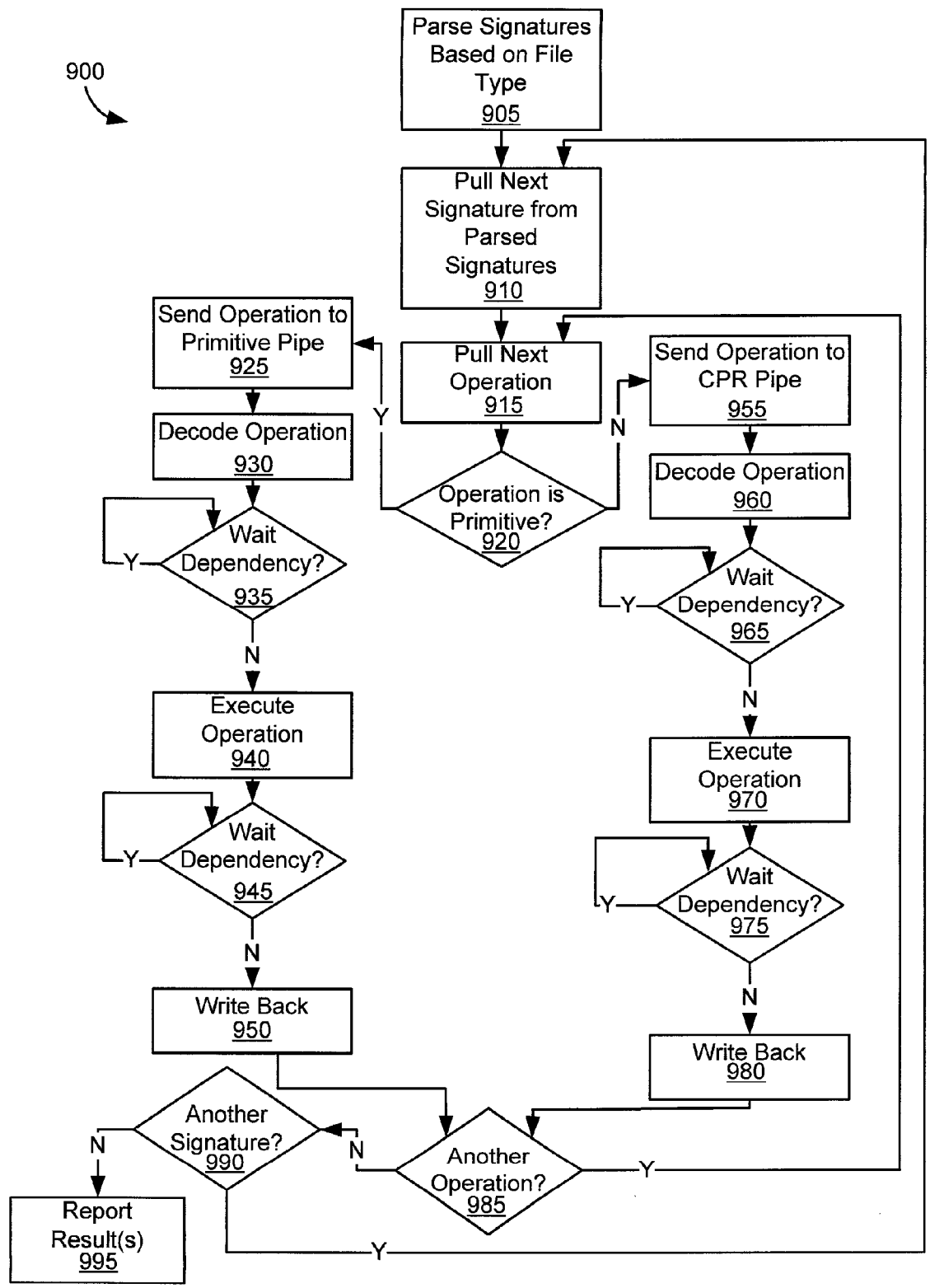
FIG. 9 is a flow diagram showing a method for using a dual pipe execution system in accordance with different embodiments of the present invention.

Turning to FIG. 9, a flow diagram 900 shows a method for using a dual pipe execution system in accordance with different embodiments of the present invention. Following flow diagram 900, a file type is received that identifies the type of a content object that is to be virus processed, and based on the file type a subset of virus signatures applicable to the file type are chosen for processing (block 905). Thus, for example, there may be hundreds of virus signatures included in a virus signature memory, but only ten of the virus signatures are applicable to the identified file type. In this case, only the ten relevant virus signatures would be executed against the particular content object. Once the subset of signatures that are to be executed are identified (block 905), the first of the identified virus signatures is accessed from the virus signature memory (block 910). The first op-code and associated immediate data are accessed from the virus signature (block 915), and it is determined whether the op-code is a CPR instruction or a primitive instruction (block 920).

Where the instruction is a primitive instruction (block 920), the operation is sent to the primitive pipe for execution (block 925). Alternatively, where the instruction is not a primitive instruction (block 920), the instruction is sent to the CPR pipe for execution (block 955). Where the instruction is sent to the primitive pipe for execution (block 925), it is decoded (block 930). It is also determined if execution of the received instruction is to be delayed (block 935). Such a delay may be warranted where, for example, a preceding CPR instruction has not yet been executed and the delay function assures that an ordered execution of intermixed primitive instructions and CPR instructions is assured. Where no delay is to be incurred or the delay has been satisfied (block 935), the op-code is executed (block 940). This may included, but is not limited to, executing one of the instructions included in Table 2 above. It is then determined if another wait state is to be implemented prior to a write back of the results of the concluded execution (block 945). Such a delay may be warranted where, for example, a preceding CPR instruction has not yet performed its write back. Where no delay is to be incurred or the delay has been satisfied (block 945), the result of the execution is written back to memory in an appropriate location (block 950).

Alternatively, where the instruction is sent to the CPR pipe for execution (block 955), it is decoded (block 960). It is also determined if execution of the received instruction is to be delayed (block 965). Such a delay may be warranted where, for example, a preceding primitive instruction has not yet been executed and the delay function assures that an ordered execution of intermixed primitive instructions and CPR instructions is assured. In some cases, this is highly unlikely and the wait dependency may be eliminated from the CPR pipe. Where no delay is to be incurred or the delay has been satisfied (block 965), the op-code is executed (block 970). This may included, but is not limited to, executing one of the instructions included in Table 1 above. The virus co-processor execution of a common CPR instruction may involve accessing a portion of a content object from a system memory and comparing the portion of the content object against a string included with the op-code. It is then determined if another wait state is to be implemented prior to a write back of the results of the concluded execution (block 975). Such a delay may be warranted where, for example, a preceding primitive instruction has not yet performed its write back. Again, where this is unlikely or impossible, the wait dependency may be eliminated from the CPR pipe. Where no delay is to be incurred or the delay has been satisfied (block 975), the result of the execution is written back to memory in an appropriate location (block 980).

It is determined if another operation is to be completed in relation to the currently processing virus signature (block 985). Where another operation remains to be executed (block 985), the next operation is pulled (block 915) and the preceding processes are repeated for the new instruction (blocks 920-980). Alternatively, where no additional operations remain to be processed (block 985), the virus signature has been completed and it is determined if another virus signature remains to be processed (block 990). Where another virus signature remains to be processed (block 990), the next virus signature is pulled from the identified virus signatures (block 910) and the previously described processes are repeated for the new virus signature (blocks 915-985). Alternatively, where no virus signatures remain to be processed (block 990), any results from the processing of the virus signature(s) is reported back (block 995).

In some embodiments of the present invention, accessing a content object from the system memory is accomplished using a virtual addressing scheme. Thus, rather than forcing a general purpose processor to write content objects to the system memory using physical addresses or forcing a content object to be re-copied to a physical address, a virus co-processor in accordance with some embodiments of the present invention may incorporate a virtual address mechanism that allows it to access content objects virtually, rather than physically. This may result in substantial savings of memory bandwidth and reduce the complexity of the interaction between a virus co-processor and a general purpose processor.

Figure 10A:
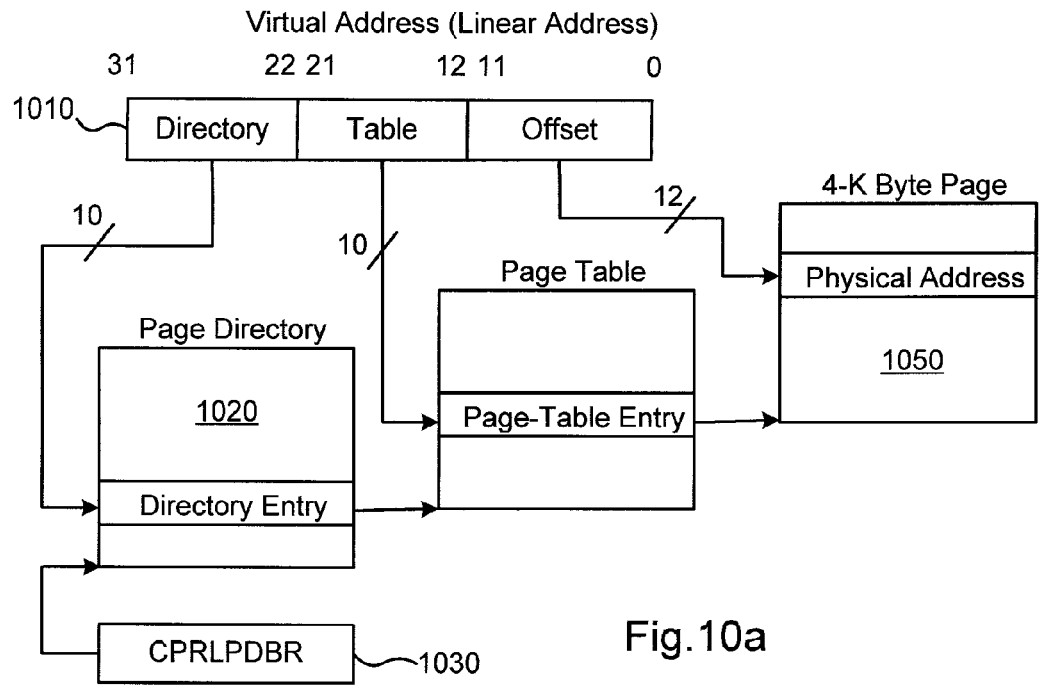
FIGS. 10A-10B depict an exemplary virtual addressing scheme that may be used in relation to different embodiments of the present invention.

Turning to FIG. 10, an exemplary virtual addressing scheme that may be used in relation to different embodiments of the present invention is depicted. In particular, FIG. 10A shows a hierarchy of a page directory 1020 and a page-table 1040 utilized when mapping linear addresses 1010 to exemplary 4-KByte pages 1050. The entries in page directory 1020 point to page tables 1040, and the entries in page tables 1040 point to pages 1050 in physical memory. A register 1030 is used to indicate when an associated general purpose processor has invalidated page directory 1020. Where such an invalidation occurs, it is up to the virus co-processor to refresh the page table by accessing the system memory.

Figure 10B:
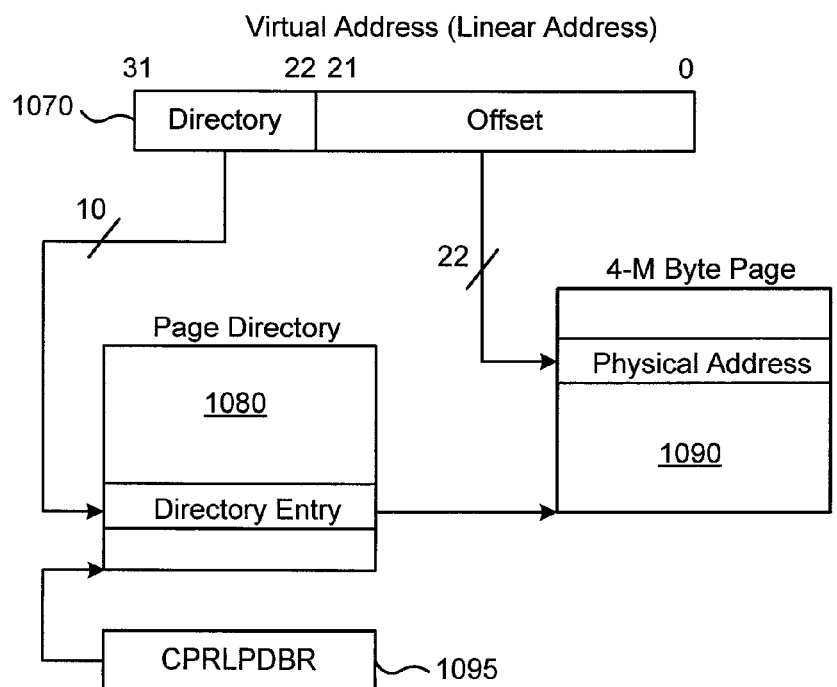

FIG. 10B shows a process for using a page directory 1080 to map a linear address 1070 to exemplary 4-MByte pages 1090. The entries in page directory 1080 point to 4-MByte pages 1090 in physical memory. A register 1095 is used to indicate when an associated general purpose processor has invalidated one or more page directory 1080. Where such an invalidation occurs, it is up to the virus co-processor to refresh the page table by accessing the system memory.

In operation, a virus co-processor capable of virtual addressing a system memory stores the most recently used page-directory 1020, 1080 and page-table 1040 entries in on-chip caches called translation lookaside buffers or TLBs. In some embodiments of the present invention, the virus co-processor implements virtual addressing only for accesses to content objects from a system memory via a PCI bus. In such cases, instructions or virus signatures may be accessed from a local virus signature memory using physical addresses. Thus, in such cases, the virus co-processor only includes a TLB for the system memory. Such a TLB may include reference for both 4-KByte pages 1050 and 4-MByte pages 1090. Most paging may be performed using the contents of the TLBs inside the same task. PCI bus cycles to the page directory and page tables in memory are performed only when the TLBs do not contain the translation information for a requested page. The TLBs may be invalidated when a page-directory or page-table entry is changed between different tasks.

In conclusion, the invention provides novel systems, circuits, devices, methods and arrangements for improved virus protection. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method of virus processing content objects, the method comprising:
   storing, by a general purpose processor, a content object that is to be virus processed to a system memory of the general purpose processor using a virtual address, the system memory having stored therein a page directory and a page table containing information for translating virtual addresses to physical addresses within a physical address space of the system memory;
   caching, by a virus co-processor, coupled to the general purpose processor via an interconnect bus, a plurality of most recently used entries of the page directory and the page table within one or more translation lookaside buffers implemented within an on-chip cache of the virus co-processor;
   reading, by a virus co-processor, a subset of instructions from a virus signature memory of the virus co-processor, the subset of instructions containing op-codes of a first instruction type and op-codes of a second instruction type;
   assigning, by the virus co-processor, instructions of the subset of instructions of the first instruction type to a first instruction pipe of a plurality of instruction pipes of the virus co-processor for execution; and
   executing, by the first instruction pipe, an instruction of the instructions assigned to the first instruction pipe including accessing a portion of the content object from the system memory by performing direct virtual memory addressing of the system memory using a physical address derived based on the virtual address and the one or more translation lookaside buffers and comparing the portion of the content object against a string associated with the instruction.

2. The method of claim 1, further comprising:
   determining, by the virus co-processor, a type associated with the content object; and
   wherein said reading, by a virus co-processor, a subset of instructions from a virus signature memory of the virus co-processor is based on the type.

3. The method of claim 2, wherein said determining is based on a file type associated with the content object.

4. The method of claim 1, wherein the op-codes of the first instruction type are associated with Content Pattern Recognition (CPR) instructions and wherein the op-codes of the second instruction type are associated with primitive instructions.

5. The method of claim 4, further comprising assigning, by the virus co-processor, instructions of the subset of instructions of the second instruction type to a second instruction pipe of the virus co-processor for execution.

6. The method of claim 5, wherein said reading comprises:
   fetching, by a unified fetch and parse module of the virus co-processor, an instruction from an instruction cache when the instruction is available in the instruction cache; otherwise, if the instruction is not available in the instruction cache, then fetching by the unified fetch and parse module, the instruction from the virus signature memory.

7. The method of claim 5, wherein the subset of instructions contains intermixed op-codes of the first instruction type and the second instruction type and wherein the method further comprises determining if execution, by the second instruction pipe, of an instruction of the instructions assigned to the second instruction pipe is to be delayed to assure ordered execution of the intermixed op-codes.

8. The method of claim 7, further comprising writing, by the first instruction pipe, a result of said executing to the system memory.

9. The method of claim 8, further comprising performing a first write back to the system memory associated with a preceding instruction before performing a second write back to the system memory associated with a succeeding instruction.

10. The method of claim 9, wherein the preceding instruction is a first instruction of the instructions assigned to the first instruction pipe and the succeeding instruction is a second instruction of the instructions assigned to the second instruction pipe.

11. A method of virus processing content objects, the method comprising:
   a step for storing, by a general purpose processor, a content object that is to be virus processed to a system memory of the general purpose processor using a virtual address, the system memory having stored therein a page directory and a page table containing information for translating virtual addresses to physical addresses within a physical address space of the system memory;
   a step for caching, by a virus co-processor, coupled to the general purpose processor via an interconnect bus, a plurality of most recently used entries of the page directory and the page table within one or more translation lookaside buffers implemented within an on-chip cache of the virus co-processor;
   a step for reading, by a virus co-processor, a subset of instructions from a virus signature memory of the virus co-processor, the subset of instructions containing op-codes of a first instruction type and op-codes of a second instruction type;

a step for assigning, by the virus co-processor, instructions of the subset of instructions of the first instruction type to a first instruction pipe of a plurality of instruction pipes of the virus co-processor for execution; and a step for executing, by the first instruction pipe, an instruction of the instructions assigned to the first instruction pipe including accessing a portion of the content object from the system memory by performing direct virtual memory addressing of the system memory using a physical address derived based on the virtual address and the one or more translation lookaside buffers and comparing the portion of the content object against a string associated with the instruction.

12. The method of claim 11, further comprising:

a step for determining, by the virus co-processor, a type associated with the content object; and wherein said step for reading, by a virus co-processor, a subset of instructions from a virus signature memory of the virus co-processor is based on the type.

13. The method of claim 12, wherein said step for determining is based on a file type associated with the content object.

14. The method of claim 11, wherein the op-codes of the first instruction type are associated with Content Pattern Recognition (CPR) instructions and wherein the op-codes of the second instruction type are associated with primitive instructions.

15. The method of claim 14, further comprising a step for assigning, by the virus co-processor, instructions of the subset of instructions of the second instruction type to a second instruction pipe of the virus co-processor for execution.

16. The method of claim 15, wherein said reading comprises:

a step for fetching, by a unified fetch and parse module of the virus co-processor, an instruction from an instruction cache when the instruction is available in the instruction cache;

otherwise, if the instruction is not available in the instruction cache, then a step for fetching by the unified fetch and parse module, the instruction from the virus signature memory.

17. The method of claim 15, wherein the subset of instructions contains intermixed op-codes of the first instruction type and the second instruction type and wherein the method further comprises a step for determining if execution, by the second instruction pipe, of an instruction of the instructions assigned to the second instruction pipe is to be delayed to assure ordered execution of the intermixed op-codes.

18. The method of claim 17, further comprising a step for writing, by the first instruction pipe, a result of said executing to the system memory.

19. The method of claim 18, further comprising a step for performing a first write back to the system memory associated with a preceding instruction before performing a second write back to the system memory associated with a succeeding instruction.

20. The method of claim 19, wherein the preceding instruction is a first instruction of the instructions assigned to the first instruction pipe and the succeeding instruction is a second instruction of the instructions assigned to the second instruction pipe.

* * * * *